US012594894B2

(12) United States Patent
Wenzel et al.

(10) Patent No.: US 12,594,894 B2
(45) Date of Patent: *Apr. 7, 2026

(54) METHOD AND APPARATUS FOR STITCHING A THREE DIMENSIONAL FORMED COMPONENT AND COMPONENTS FORMED FROM THE METHOD

(71) Applicant: Inteva Products, LLC, Troy, MI (US)

(72) Inventors: Edward J. Wenzel, Troy, MI (US); Ramez M. Habhab, Rochester Hills, MI (US)

(73) Assignee: INTEVA PRODUCTS LLC, Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/975,792

(22) Filed: Dec. 10, 2024

(65) Prior Publication Data

US 2025/0214518 A1      Jul. 3, 2025

Related U.S. Application Data

(60) Continuation of application No. 17/713,093, filed on Apr. 4, 2022, now Pat. No. 12,162,413, which is a
(Continued)

(51) Int. Cl.
D05B 57/02 (2006.01)
B60R 13/02 (2006.01)
(Continued)

(52) U.S. Cl.
CPC ............... B60R 13/02 (2013.01); D05B 1/06 (2013.01); D05B 1/08 (2013.01); D05B 15/00 (2013.01); D05B 57/02 (2013.01)

(58) Field of Classification Search
CPC .. D05B 1/06; D05B 1/08; D05B 15/00; B60R 13/02; B05B 57/02
See application file for complete search history.

(56) References Cited

U.S. PATENT DOCUMENTS 1,419,997 A * 6/1922 Valois ................... D05B 15/00
                                                                      12/7.7
1,613,605 A 1/1927 Corrall et al.
(Continued)

FOREIGN PATENT DOCUMENTS

CN        87103297 A      11/1987
CN        1250496 A       4/2000
(Continued)

OTHER PUBLICATIONS

CN Notification of Rectification corresponding to CN Application No. 202320728468.7; Issue Date, Sep. 12, 2023, 2 pages.
(Continued)

*Primary Examiner* — Tajash D Patel
(74) *Attorney, Agent, or Firm* — CANTOR COLBURN LLP

(57) ABSTRACT

An apparatus and method for applying stitches to a decorative component having a three dimensional configuration is provided. A head for applying stitches to a decorative component having a three dimensional configuration, including: a needle bar assembly operatively coupled to the head; a looper configured to cooperate with the needle bar assembly in order to provide a plurality of stitches in the decorative component, the looper rotating in a plane parallel to the decorative component; a post assembly configured to drive the looper in a reciprocating fashion in the plane, wherein the post assembly is operatively coupled to a motor configured to drive the needle bar assembly in a reciprocating fashion, the post assembly being operatively coupled to the head via a cylinder arm assembly and a downshaft assembly; and wherein the cylinder arm assembly is rotated in a synchronized manner with a rock frame through mechanical linkage connecting a rock frame drive shaft to the cylinder arm assembly.

20 Claims, 19 Drawing Sheets

Related U.S. Application Data continuation-in-part of application No. 16/533,345, filed on Aug. 6, 2019, now Pat. No. 11,292,401, which is a division of application No. 14/876,636, filed on Oct. 6, 2015, now Pat. No. 10,421,413.

(60) Provisional application No. 62/060,487, filed on Oct. 6, 2014.

(51) Int. Cl.
| | |
|---|---|
| *D05B 1/06* | (2006.01) |
| *D05B 1/08* | (2006.01) |
| *D05B 15/00* | (2006.01) |

(56) References Cited

U.S. PATENT DOCUMENTS

| | | | | |
|---|---|---|---|---|
| 1,731,221 | A | 10/1929 | Becker | |
| 1,840,571 | A | 1/1932 | Eames | |
| 2,003,879 | A | 6/1935 | De | |
| 2,097,462 | A * | 11/1937 | Leveque | D05B 15/04 |
| | | | | 112/57 |
| 2,147,006 | A | 2/1939 | Zablocki | |
| 2,386,660 | A | 10/1945 | Clayton | |
| 2,528,575 | A | 11/1950 | Sailer | |
| 2,720,852 | A * | 10/1955 | Hay | D05B 15/00 |
| | | | | 112/55 |
| 3,216,386 | A | 11/1965 | Luigi | |
| 3,468,275 | A | 9/1969 | Fake | |
| 4,425,859 | A | 1/1984 | Ishitani | |
| 4,711,190 | A | 12/1987 | Smith | |
| 4,771,715 | A | 9/1988 | Inagaki | |
| 4,848,252 | A | 7/1989 | Ciucani | |
| 4,879,960 | A | 11/1989 | Prais | |
| 5,333,565 | A | 8/1994 | Frye | |
| 5,704,302 | A | 1/1998 | Tseng | |
| 6,263,815 | B1 | 7/2001 | Furudate | |
| 6,962,120 | B1 | 11/2005 | Fujikura et al. | |
| 8,919,270 | B2 | 12/2014 | Wenzel et al. | |
| 9,255,352 | B2 | 2/2016 | Wenzel et al. | |
| 9,605,366 | B2 | 3/2017 | Koike et al. | |
| 9,889,802 | B2 | 2/2018 | Wenzel et al. | |
| 10,364,520 | B2 | 7/2019 | Wenzel et al. | |
| 10,421,413 | B2 | 9/2019 | Wenzel et al. | |
| 11,292,401 | B2 | 4/2022 | Wenzel et al. | |
| 12,162,413 | B2 * | 12/2024 | Wenzel | B60R 13/02 |
| 2005/0178307 | A1 | 8/2005 | Frazer et al. | |
| 2006/0197321 | A1 | 9/2006 | Saito | |
| 2007/0193673 | A1 | 8/2007 | Aoyama et al. | |
| 2008/0216722 | A1 | 9/2008 | Yamasaki | |
| 2009/0090285 | A1 | 4/2009 | Dooley et al. | |
| 2010/0326341 | A1 | 12/2010 | Mingazhev et al. | |
| 2012/0313391 | A1 | 12/2012 | Kornylo | |
| 2013/0008362 | A1 | 1/2013 | Wenzel et al. | |
| 2013/0153122 | A1 | 6/2013 | Filipp et al. | |
| 2015/0042117 | A1 | 2/2015 | Wenzel et al. | |
| 2015/0176165 | A1 | 6/2015 | Wenzel et al. | |
| 2016/0096490 | A1 | 4/2016 | Wenzel et al. | |
| 2019/0359149 | A1 | 11/2019 | Wenzel et al. | |
| 2019/0360141 | A1 | 11/2019 | Ikadai et al. | |
| 2022/0314902 | A1 | 10/2022 | Wenzel et al. | |
| 2023/0313430 | A1 | 10/2023 | Wenzel et al. | |

FOREIGN PATENT DOCUMENTS

| | | | |
|---|---|---|---|
| CN | 2587903 | Y | 11/2003 |
| CN | 101024478 | A | 8/2007 |
| CN | 101638833 | A | 2/2010 |
| CN | 102808291 | A | 12/2012 |
| CN | 202688649 | U | 1/2013 |
| CN | 102933759 | A | 2/2013 |
| CN | 103649396 | A | 3/2014 |
| CN | 103649397 | | 3/2014 |
| CN | 106795675 | A | 5/2017 |
| EP | 2581481 | A1 | 1/2013 |
| GB | 976937 | A | 12/1964 |
| JP | 2002320786 | A | 11/2002 |
| JP | 2006273312 | A | 10/2006 |
| JP | 2008142474 | A | 6/2008 |
| JP | 201343571 | A | 3/2013 |
| JP | 2014520602 | A | 8/2014 |
| JP | 2014171391 | A | 9/2014 |
| TW | 201002897 | A | 1/2010 |
| WO | 2009113337 | A1 | 9/2009 |
| WO | WO-2018135251 | A1 * | 7/2018 ............. D05B 69/02 |

OTHER PUBLICATIONS

CN Office Action for Application No. 201580054235; Date of Mailing: Jul. 15, 2020.

CN Office Action for Application No. 201580054235; Date of Mailing: Sep. 23, 2019.

CN Office Action for Application No. 2015800542351; Dated: Dec. 19, 2019.

CN Office Action Issued Feb. 3, 2019 for Application No. 2101580054235.1.

CN Search Report for Application No. 2101580054235.1 dated Jan. 28, 2019.

CN Search Report for Application No. 2101580054235.1 dated Sep. 14, 2019.

CN Search Report for Application No. 21015800542351.

EP OA Issued Jan. 23, 2019 for Application No. 15 849 292.6.

EP OA Issued Jan. 23, 2019 for Application No. 17 183 276.9.

European Office Action for Europe Application No. 17183276.9; Application Filing Date: Jul. 26, 2017; Date of Action: Aug. 25, 2021; 4 pages.

European Search Report for Application No. EP 17 18 3276 dated Mar. 8, 2018.

French Office Action corresponding to FR Application No. 2303344; Issue Date, Jul. 10, 2023, 5 pages.

German Office Action corresponding to DE Application No. 20 2023 101 706.1; Issue Date, Jun. 12, 2023, 1 page.

International Preliminary Report on Patentability for Application No. PCT/US2015/054276 dated Apr. 11, 2017.

International Search Report for International Application No. PCT/US2015/054276; International filing date: Oct. 6, 2015; Date of Mailing: Mar. 3, 2016; 4 pgs.

JP Office Action for Application No. 2017-518244; Dated: Sep. 17, 2019.

JP Office Action Issued Jun. 30, 2021 for Application No. 2020-024321.

JP Office Action Issued Mar. 30, 2021 for Application No. 2020-024321.

Korean Office Action for Korean Application No. 1020177010883; Date of Mailing: Dec. 10, 2021; 3 Pages.

Korean Office Action for Korean Application No. 10-2022-7004657 Issued May 4, 2022, 5 Pages.

Search Report for Application No. 201580054235; Dated: Jul. 9, 2020.

Shoe-making Machine, Jin Shaowen, China Light Industry Press, Jun. 2012, first edition, the last on p. 148 to the first paragraph on p. 149).

Supplemental Search Report for Application No. 201580054235.1; Dated: Dec. 19, 2019.

Supplemental Search Report for Application No. 201580054235.1; Dated: Feb. 3, 2019.

Supplemental Search Report for Application No. 201580054235.1; Dated: Jul. 15, 2020.

Supplemental Search Report for Application No. 201580054235.1; Dated: Sep. 23, 2019.

Supplementary European Search Report for Application No. EP 15 84 9292 dated Mar. 7, 2018.

U.S. Notice of Allowance corresponding to U.S. Appl. No. 18/130,639; Issue Date, Aug. 27, 2024.

US Non-Final Office Action corresponding to U.S. Appl. No. 14/876,636; Issue date, May 11, 2018, 10 pages.

US Non-Final Office Action corresponding to U.S. Appl. No. 16/533,345; Issue date, Jul. 21, 2021, 32 pages.

(56) References Cited

OTHER PUBLICATIONS

US Non-Final Office Action corresponding to U.S. Appl. No. 17/713,093; Mailing Date, Mar. 19, 2024.
Written Opinion for Application No. 17 183 276.9.
Written Opinion for Application No. EP 15 84 9292.
Written Opinion for International Application No. PCT/US2015/054276; International filing date: Oct. 6, 2015; Date of Mailing: Mar. 3, 2016; 5 pgs.
Chinese First Office Action corresponding to CN Application No. 202310355687.X; Issue date, Jul. 23, 2025, 22 pages.
French Search Report for FR Application No. 2303344; Issue date, Jun. 19, 2025, 2 pages.
French Written Opinion for FR Application No. 2303344; Issue date, Jun. 19, 2025, 8 pages.
CNIPA Notification of Second Office Action corresponding to CN Application No. 202310355687.X; Issue Date, Jan. 20, 2026, 18 pages.

* cited by examiner

Position 3

Position 2

Position 1

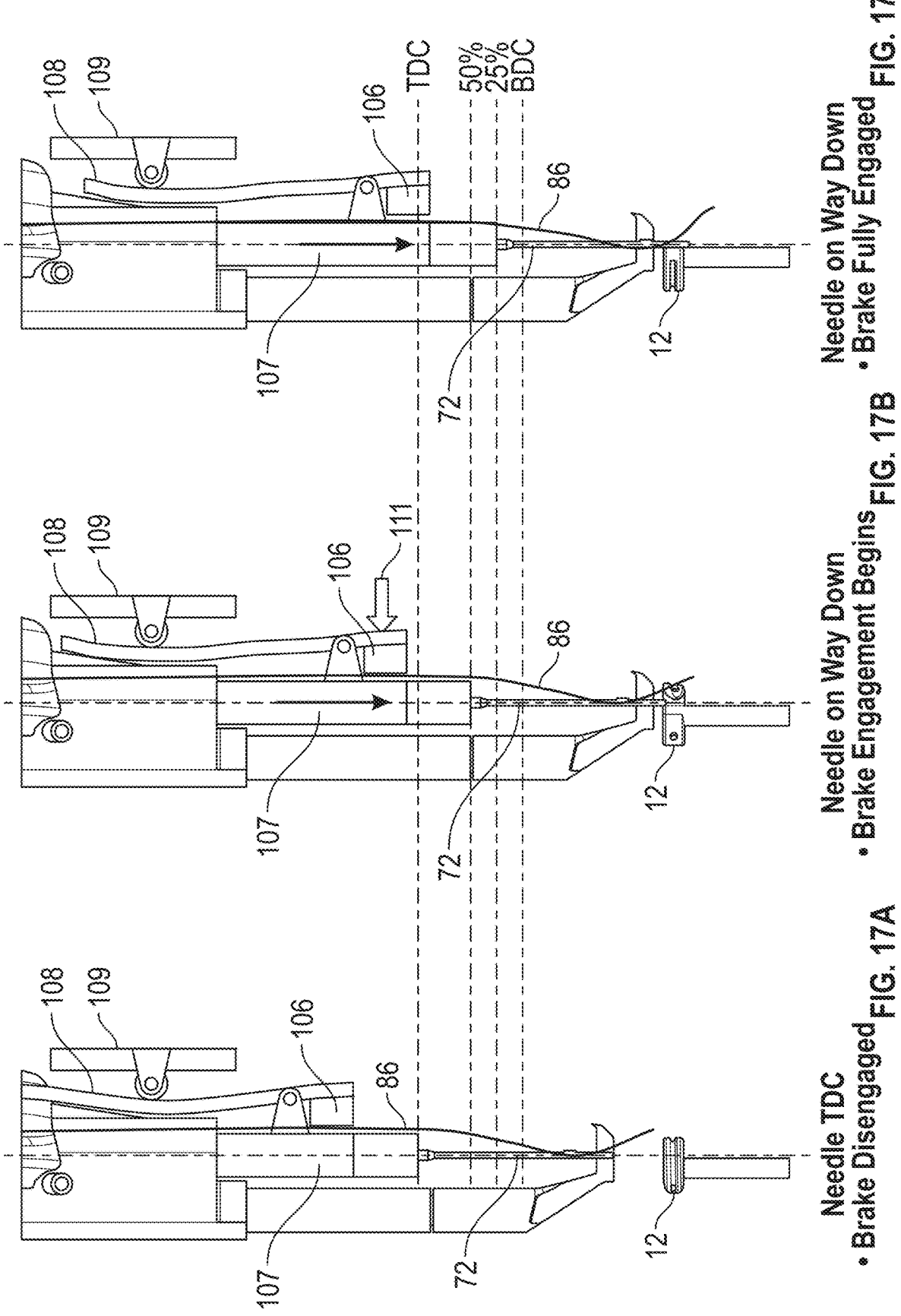
Needle TDC
• Brake Disengaged  FIG. 17A
Needle on Way Down
• Brake Engagement Begins  FIG. 17B
Needle on Way Down
• Brake Fully Engaged  FIG. 17C

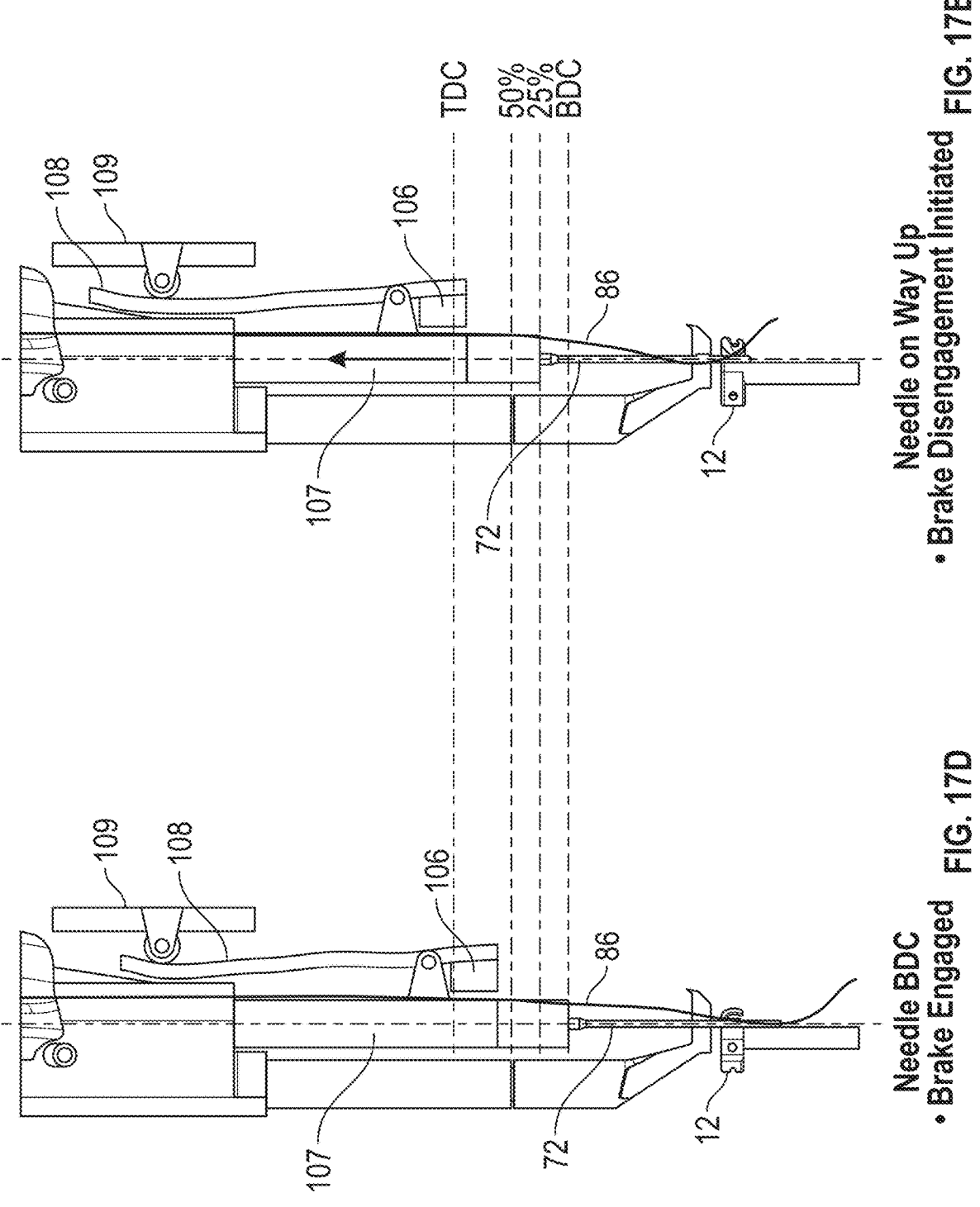
Needle on Way Up
• Brake Disengagement Initiated    FIG. 17E
Needle BDC
• Brake Engaged    FIG. 17D

TDC

Brake Applied

BDC (Brake Applied)

Brake Applied

1

METHOD AND APPARATUS FOR STITCHING A THREE DIMENSIONAL FORMED COMPONENT AND COMPONENTS FORMED FROM THE METHOD

CROSS REFERENCE TO RELATED APPLICATIONS

This application is a continuation of U.S. patent application Ser. No. 17/713,093 filed on Apr. 4, 2022, which is a continuation-in-part application of U.S. patent application Ser. No. 16/533,345 filed on Aug. 6, 2019, which is a divisional application of U.S. patent application Ser. No. 14/876,636 filed on Oct. 6, 2015, now U.S. Pat. No. 10,421,413, which claims the benefit of U.S. Provisional Application Ser. No. 62/060,487 filed on Oct. 6, 2014, the contents each of which are incorporated herein by reference thereto.

BACKGROUND

This invention relates to an interior structure for a vehicle interior. More particularly, the invention relates to an apparatus and method for stitching vehicle interior components. Still further, various embodiments of the present invention relate to placing a decorative stitch on a trim piece having a three dimensional configuration regardless of whether it is used in a vehicle or not.

Most stitching found in an automotive interior is of the functional variety, wherein two or more pieces of material (leather, vinyl, TPO, cloth, etc) are cut from a pattern and sewn together (cut-n-sew) prior to being wrapped around a component such as a seat cushion, head rest, arm rest, console lid, instrument panel substrate, etc. Such functional stitching is very labor intensive and is normally used only where required on low and mid-class vehicles. Functional stitching on decorate components such as instrument panel retainers and door panels has typically been restricted to higher class vehicles due to cost.

In recent years, automotive original equipment manufacturers (OEMs) have shown an interest in applying the "stitched" look to more vehicles over a wider range of price classes. A simulated non-functional stitch has been used in some applications however the ability to offer a simulated stitch in a contrasting color is not production feasible at this time. Additionally, more OEMs are requesting that a real or "live" stitch be used on decorative components to provide the look and feel of a true cut-n-sew component.

Current means of placing a decorative stitch on a 3D preformed automotive trim component consist of penetrating the part (skin, skin/foam, or skin/foam/substrate) with a needle from the top side of the part and engaging a hook or looper located on the backside of the part. These methods required access to both the front and backside of the part, which often limits the location of stitch placement on the parts. Placement of stitching on brows, sharp corners, and highly contoured surfaces as often seen with true cut and sew wrapped automotive interior trim is often very difficult.

For example, applying stitching in the direction perpendicular to and over the edge of a semi-rigid part remains difficult, as the stitchplate depth requirements on existing machines precludes the plate from conforming to the small radii. Additionally, stitching around small in-plane radii can also be difficult, as predefined clearances for stitch plate movement are required.

Accordingly, it is desirable to provide a method and apparatus for producing a live, non-functional stitch on decorative automotive trim components. It is also desirable to provide a component with such a stitch.

SUMMARY OF THE INVENTION

In one embodiment, an apparatus and method for applying stitches to a decorative component having a three dimensional configuration is provided.

In one embodiment, the apparatus has a head with a needle bar assembly operatively coupled to the head; a looper configured to cooperate with the needle bar assembly in order to provide a plurality of stitches in the decorative component, the looper rotating in a plane parallel to the decorative component; and a post assembly configured to drive the looper in a reciprocating fashion in the plane, wherein the post assembly is operatively coupled to a motor configured to drive the needle bar assembly in a reciprocating fashion.

In addition to one or more of the features described above, or as an alternative to any of the foregoing embodiments, the needle bar assembly may be reciprocally driven by an upper driveshaft operatively coupled to the motor and the post assembly is also reciprocally driven by the upper driveshaft via an intermediary driveshaft.

In addition to one or more of the features described above, or as an alternative to any of the foregoing embodiments, the post assembly may be operatively coupled to the head via a cylinder arm assembly and a downshaft assembly.

In addition to one or more of the features described above, or as an alternative to any of the foregoing embodiments, the at least one of the cylinder arm assembly and/or the downshaft assembly may be removably secured to the head such that another cylinder arm assembly and/or another down shaft assembly is capable of being secured to the head such that the post assembly is relocated with respect to the needle bar assembly of the head.

In addition to one or more of the features described above, or as an alternative to any of the foregoing embodiments, the cylinder arm assembly and the downshaft assembly may be interchangeable with another cylinder arm assembly and another downshaft assembly such that the post assembly can be relocated with respect to the needle bar assembly.

In addition to one or more of the features described above, or as an alternative to any of the foregoing embodiments, another needle and another looper configured to cooperate with the another needle in order to simultaneously provide two discrete patterns of a plurality of stitches in the decorative component may be provided, the another looper rotating in the plane parallel to the decorative component.

In addition to one or more of the features described above, or as an alternative to any of the foregoing embodiments, the post assembly may be configured to drive the looper and the another looper in a reciprocating fashion in the plane, wherein the post assembly is operatively coupled to a motor configured to drive the needle bar assembly containing two needles in a reciprocating fashion.

In addition to one or more of the features described above, or as an alternative to any of the foregoing embodiments, the looper may be located in a post housing of the post assembly that is only slightly larger than a dimension of the looper such that a stitch plate of the post housing may be located proximate to a backside of the decorative component.

In addition to one or more of the features described above, or as an alternative to any of the foregoing embodiments, the looper may be located in a post housing of the post assembly that is only slightly larger than a dimension of the looper such that a stitch plate of the post housing may be located proximate to a backside of the decorative component and wherein the dimension is aligned or in line with a stitch direction of the plurality of stitches.

In addition to one or more of the features described above, or as an alternative to any of the foregoing embodiments, the dimension may be in the range of 10-12 mm.

In yet another embodiment, a head for applying stitches to a decorative component having a three dimensional configuration and a corner is provided. The head having: a needle bar assembly operatively coupled to the head; a looper configured to cooperate with the needle bar assembly in order to provide a plurality of stitches in the decorative component, the looper rotating in a plane parallel to the decorative component; and a post assembly configured to drive the looper in a reciprocating fashion in the plane, wherein the post assembly is operatively coupled to a motor configured to drive the needle bar assembly in a reciprocating fashion, wherein the looper is located in a post housing of the post assembly that is only slightly larger than a dimension of the looper such that a stitch plate of the post housing may be located proximate to a backside of the corner of the decorative component.

In addition to one or more of the features described above, or as an alternative to any of the foregoing embodiments, the dimension may be aligned or in line with a stitch direction of the plurality of stitches.

In addition to one or more of the features described above, or as an alternative to any of the foregoing embodiments, the dimension may be in the range of 10-12 mm.

A decorative component having a plurality of stitches applied thereto by a head of any of the foregoing embodiments may be provided, and the decorative component may be an interior trim piece of a vehicle.

A decorative component having a plurality of stitches applied thereto by a head of any of the foregoing embodiments, wherein the interior trim piece may be an instrument panel.

A decorative component having a plurality of stitches applied thereto by a head of any of the foregoing embodiments, wherein at least some of the plurality of stitches may be applied in the corner of the decorative component.

In another embodiment, a method of applying stitching to an interior component of a vehicle, comprising at least one layer is provided. The method including the steps of: a) penetrating the at least one layer at an entry point on a first surface of the at least one layer with a needle, wherein the step of penetrating causes the needle to reach a bottom dead center of its range of travel and also cause a top thread to pass through the at least one layer at an exit point, the exit point being on a second surface opposite to the first surface; b) grabbing the thread with a rotary looper located proximate to the exit point, wherein the rotary looper rotates in a first direction in a plane parallel to the at least one layer; c) retracting the needle through the exit point and the entry point to a top dead center position of its range of travel; d) advancing the component in a first direction; e) rotating the rotary looper in a second direction in the plane parallel to the at least one layer, the second direction being opposite to the first direction; f) penetrating the at least one layer at another entry point on the first surface of the at least one layer with the needle, wherein the step of penetrating causes the top thread to pass through the at least one layer at another exit point, the another exit point being on the second surface opposite to the first surface and wherein the needle engages a bottom thread located on the rotary looper; g) releasing the top thread as the rotary looper rotates in the second direction; h) completing a stitch between the top thread and the bottom thread as the rotary looper rotates to a final position in the second direction and the needle reaches a bottom of its downward stroke; and i) repeating steps b-h until a desired amount of stitches are formed in the interior component.

In addition to one or more of the features described above, or as an alternative to any of the foregoing embodiments, the outer skin layer, may be formed from the group consisting of vinyl, leather and thermoplastic polyolefin.

In addition to one or more of the features described above, or as an alternative to any of the foregoing embodiments, an interior component is formed by the methods described above and the interior component may be an interior trim piece of a vehicle.

In addition to one or more of the features described above, or as an alternative to any of the foregoing embodiments, wherein the interior trim piece may be a portion of an instrument panel of the vehicle.

In addition to one or more of the features described above, or as an alternative to any of the foregoing embodiments, an interior component is formed by the methods described above and the interior component may be an interior trim piece of a vehicle.

In addition to one or more of the features described above, or as an alternative to any of the foregoing embodiments, the interior trim piece may be a portion of an instrument panel of the vehicle.

In addition to one or more of the features described above, or as an alternative to any of the foregoing embodiments, the outer skin layer may be formed from the group consisting of vinyl, leather and thermoplastic polyolefin; and wherein an intermediary layer may be applied to a second surface of the outer skin layer, the second surface being opposite the first surface.

In addition to one or more of the features described above, or as an alternative to any of the foregoing embodiments, the intermediary layer may be a foam layer.

In addition to one or more of the features described above, or as an alternative to any of the foregoing embodiments the interior component may be an interior trim piece of a vehicle.

In addition to one or more of the features described above, or as an alternative to any of the foregoing embodiments, an interior component may be formed by the methods described above.

In addition to one or more of the features described above, or as an alternative to any of the foregoing embodiments, the interior component may be an interior trim piece of a vehicle.

In addition to one or more of the features described above, or as an alternative to any of the foregoing embodiments, the interior trim piece may be a portion of an instrument panel of the vehicle.

In addition to one or more of the features described above, or as an alternative to any of the foregoing embodiments, the outer skin layer, may be formed from the group consisting of vinyl, leather and thermoplastic polyolefin; and wherein an intermediary layer may be applied to a second surface of the outer skin layer, the second surface being opposite the first surface.

In addition to one or more of the features described above, or as an alternative to any of the foregoing embodiments, an interior component of a vehicle may formed by the above methods.

Also provided herein is an interior component of a vehicle formed by the above methods.

Disclosed is a head for applying stitches to a decorative component having a three dimensional configuration, including: a needle bar assembly operatively coupled to the head; a looper configured to cooperate with the needle bar assembly in order to provide a plurality of stitches in the decorative component, the looper rotating in a plane parallel to the decorative component; a post assembly configured to drive the looper in a reciprocating fashion in the plane, wherein the post assembly is operatively coupled to a motor configured to drive the needle bar assembly in a reciprocating fashion, the post assembly being operatively coupled to the head via a cylinder arm assembly and a downshaft assembly; and wherein the cylinder arm assembly is rotated in a synchronized manner with a rock frame through mechanical linkage connecting a rock frame drive shaft to the cylinder arm assembly.

In addition to one or more of the features described above, or as an alternative to any of the foregoing embodiments, the needle bar assembly is reciprocally driven by an upper driveshaft operatively coupled to the motor and the post assembly is also reciprocally driven by the upper driveshaft via an intermediary driveshaft.

In addition to one or more of the features described above, or as an alternative to any of the foregoing embodiments, at least one of the cylinder arm assembly and/or the downshaft assembly are removably secured to the head such that another cylinder arm assembly and/or another down shaft assembly is capable of being secured to the head such that the post assembly is relocated with respect to the needle bar assembly of the head.

In addition to one or more of the features described above, or as an alternative to any of the foregoing embodiments, at least one of the cylinder arm assembly and/or the downshaft assembly are removably secured to the head such that another cylinder arm assembly and/or another down shaft assembly is capable of being secured to the head such that the post assembly is relocated with respect to the needle bar assembly of the head.

In addition to one or more of the features described above, or as an alternative to any of the foregoing embodiments, the cylinder arm assembly and the downshaft assembly are interchangeable with another cylinder arm assembly and another downshaft assembly such that the post assembly can be relocated with respect to the needle bar assembly.

In addition to one or more of the features described above, or as an alternative to any of the foregoing embodiments, another needle and another looper are configured to cooperate with the another needle in order to simultaneously provide two discrete patterns of a plurality of stitches in the decorative component, the another looper rotating in the plane parallel to the decorative component.

In addition to one or more of the features described above, or as an alternative to any of the foregoing embodiments, the post assembly is configured to drive the looper and the another looper in a reciprocating fashion in the plane, wherein the post assembly is operatively coupled to a motor configured to drive the needle bar assembly containing two needles in a reciprocating fashion.

In addition to one or more of the features described above, or as an alternative to any of the foregoing embodiments, an upper thread brake is configured to control a size and stabilize a position of a top thread loop prior to and during engagement of the top thread with the looper.

In addition to one or more of the features described above, or as an alternative to any of the foregoing embodiments, an upper thread brake is configured to control a size and stabilize a position of a top thread loop prior to and during engagement of the top thread with the looper.

Disclosed is a method for applying stitches to a decorative component having a three dimensional configuration, including: operatively coupling a needle bar assembly to a head configured for applying the stitches to the decorative component; cooperating a looper with the needle bar assembly in order to provide a plurality of stitches in the decorative component, the looper rotating in a plane parallel to the decorative component; driving the looper in a reciprocating fashion in the plane with a post assembly, wherein the post assembly is operatively coupled to a motor configured to drive the needle bar assembly in a reciprocating fashion, the post assembly being operatively coupled to the head via a cylinder arm assembly and a downshaft assembly; and rotating the cylinder arm assembly in a synchronized manner with a rock frame through mechanical linkage connecting a rock frame drive shaft to the cylinder arm assembly.

In addition to one or more of the features described above, or as an alternative to any of the foregoing embodiments, further including reciprocally driving the needle bar assembly with an upper driveshaft operatively coupled to the motor and reciprocally driving the post assembly by the upper driveshaft via an intermediary driveshaft.

In addition to one or more of the features described above, or as an alternative to any of the foregoing embodiments, further including removably securing at least one of the cylinder arm assembly and/or the downshaft assembly are removably secured to the head such that another cylinder arm assembly and/or another down shaft assembly is capable of being secured to the head such that the post assembly is relocated with respect to the needle bar assembly of the head.

In addition to one or more of the features described above, or as an alternative to any of the foregoing embodiments, further including removably securing at least one of the cylinder arm assembly and/or the downshaft assembly to the head such that another cylinder arm assembly and/or another down shaft assembly is capable of being secured to the head such that the post assembly is relocated with respect to the needle bar assembly of the head.

In addition to one or more of the features described above, or as an alternative to any of the foregoing embodiments, the cylinder arm assembly and the downshaft assembly are interchangeable with another cylinder arm assembly and another downshaft assembly such that the post assembly can be relocated with respect to the needle bar assembly.

In addition to one or more of the features described above, or as an alternative to any of the foregoing embodiments, further including another needle and another looper configured to cooperate with the another needle in order to simultaneously provide two discrete patterns of a plurality of stitches in the decorative component, the another looper rotating in the plane parallel to the decorative component.

In addition to one or more of the features described above, or as an alternative to any of the foregoing embodiments, the post assembly is configured to drive the looper and the another looper in a reciprocating fashion in the plane, wherein the post assembly is operatively coupled to a motor configured to drive the needle bar assembly containing two needles in a reciprocating fashion.

In addition to one or more of the features described above, or as an alternative to any of the foregoing embodiments, further including controlling a size and a position of a top thread loop prior to and during engagement of the top thread loop with the looper with an upper thread brake configured to control the size and stabilize the position of the top thread loop.

In addition to one or more of the features described above, or as an alternative to any of the foregoing embodiments, further including controlling a size and a position of a top thread loop prior to and during engagement of the top thread loop with the looper with an upper thread brake configured to control the size and stabilize the position of the top thread loop.

In addition to one or more of the features described above, or as an alternative to any of the foregoing embodiments, further including controlling a size and a position of a top thread loop prior to and during engagement of the top thread loop with the looper with an upper thread brake configured to control the size and stabilize the position of the top thread loop.

Also disclosed is an apparatus for applying stitches to a decorative component having a three dimensional configuration, including: a head, including: a needle bar assembly operatively coupled to the head; a looper configured to cooperate with the needle bar assembly in order to provide a plurality of stitches in the decorative component, the looper rotating in a plane parallel to the decorative component; a post assembly configured to drive the looper in a reciprocating fashion in the plane, wherein the post assembly is operatively coupled to a motor configured to drive the needle bar assembly in a reciprocating fashion, the post assembly being operatively coupled to the head via a cylinder arm assembly and a downshaft assembly; and wherein the cylinder arm assembly is rotated in a synchronized manner with a rock frame through mechanical linkage connecting a rock frame drive shaft to the cylinder arm assembly; and an external drive for moving the head over and around the decorative component.

In addition to one or more of the features described above, or as an alternative to any of the foregoing embodiments, the external drive is a 6-axis robot.

In addition to one or more of the features described above, or as an alternative to any of the foregoing embodiments, the needle bar assembly is reciprocally driven by an upper driveshaft operatively coupled to the motor and the post assembly is also reciprocally driven by the upper driveshaft via an intermediary driveshaft.

In addition to one or more of the features described above, or as an alternative to any of the foregoing embodiments, at least one of the cylinder arm assembly and/or the downshaft assembly are removably secured to the head such that another cylinder arm assembly and/or another down shaft assembly is capable of being secured to the head such that the post assembly is relocated with respect to the needle bar assembly of the head.

In addition to one or more of the features described above, or as an alternative to any of the foregoing embodiments, at least one of the cylinder arm assembly and/or the downshaft assembly are removably secured to the head such that another cylinder arm assembly and/or another down shaft assembly is capable of being secured to the head such that the post assembly is relocated with respect to the needle bar assembly of the head.

In addition to one or more of the features described above, or as an alternative to any of the foregoing embodiments, the cylinder arm assembly and the downshaft assembly are interchangeable with another cylinder arm assembly and another downshaft assembly such that the post assembly can be relocated with respect to the needle bar assembly.

In addition to one or more of the features described above, or as an alternative to any of the foregoing embodiments, further including another needle and another looper configured to cooperate with the another needle in order to simultaneously provide two discrete patterns of a plurality of stitches in the decorative component, the another looper rotating in the plane parallel to the decorative component.

In addition to one or more of the features described above, or as an alternative to any of the foregoing embodiments, the post assembly is configured to drive the looper and the another looper in a reciprocating fashion in the plane, wherein the post assembly is operatively coupled to a motor configured to drive the needle bar assembly containing two needles in a reciprocating fashion.

In addition to one or more of the features described above, or as an alternative to any of the foregoing embodiments, further including an upper thread brake configured to control a size and stabilize a position of a top thread loop prior to and during engagement of the top thread loop with the looper.

In addition to one or more of the features described above, or as an alternative to any of the foregoing embodiments, further including an upper thread brake configured to control a size and stabilize a position of a top thread loop prior to and during engagement of the top thread loop with the looper.

BRIEF DESCRIPTION OF THE DRAWINGS

Other features, advantages and details appear, by way of example only, in the following description of embodiments, the description referring to the drawings in which:

FIGS. 17A-E illustrate the use of a thread brake or brake pad to control the size and stabilize the position of the top thread loop prior to engagement with the looper;

Although the drawings represent varied embodiments and features of the present invention, the drawings are not necessarily to scale and certain features may be exaggerated in order to illustrate and explain exemplary embodiments the present invention. The exemplification set forth herein illustrates several aspects of the invention, in one form, and such exemplification is not to be construed as limiting the scope of the invention in any manner.

DETAILED DESCRIPTION

Various embodiments of the present invention are directed to a method and apparatus that enables application of a decorative stitch to confined stitch areas of preformed parts within the transportation industry, particularly when placing a stitch over a formed edge of small radii or sewing around a small in-plane radii. The apparatus also provides the ability to adjust machine parameters to accommodate a wide variety of part sizes without the need to build multiple sewing heads.

In another embodiment, the invention described herein consists of a stitching method and head design that enhances the ability to stitch in confined areas of a three-dimensionally shaped part in a manual or automated fashion for applications within the transportation industry.

Referring now to FIGS. 1-4 an oscillatory chain stitch machine 10 in accordance with one non-limiting embodiment of the present invention is illustrated. The machine 10 provides a chain type stitch with the use of an oscillatory butterfly looper 12 at the end of a combination looper and post assembly 14 operatively coupled to a cylinder arm assembly 16.

Figures 12A, 12B:
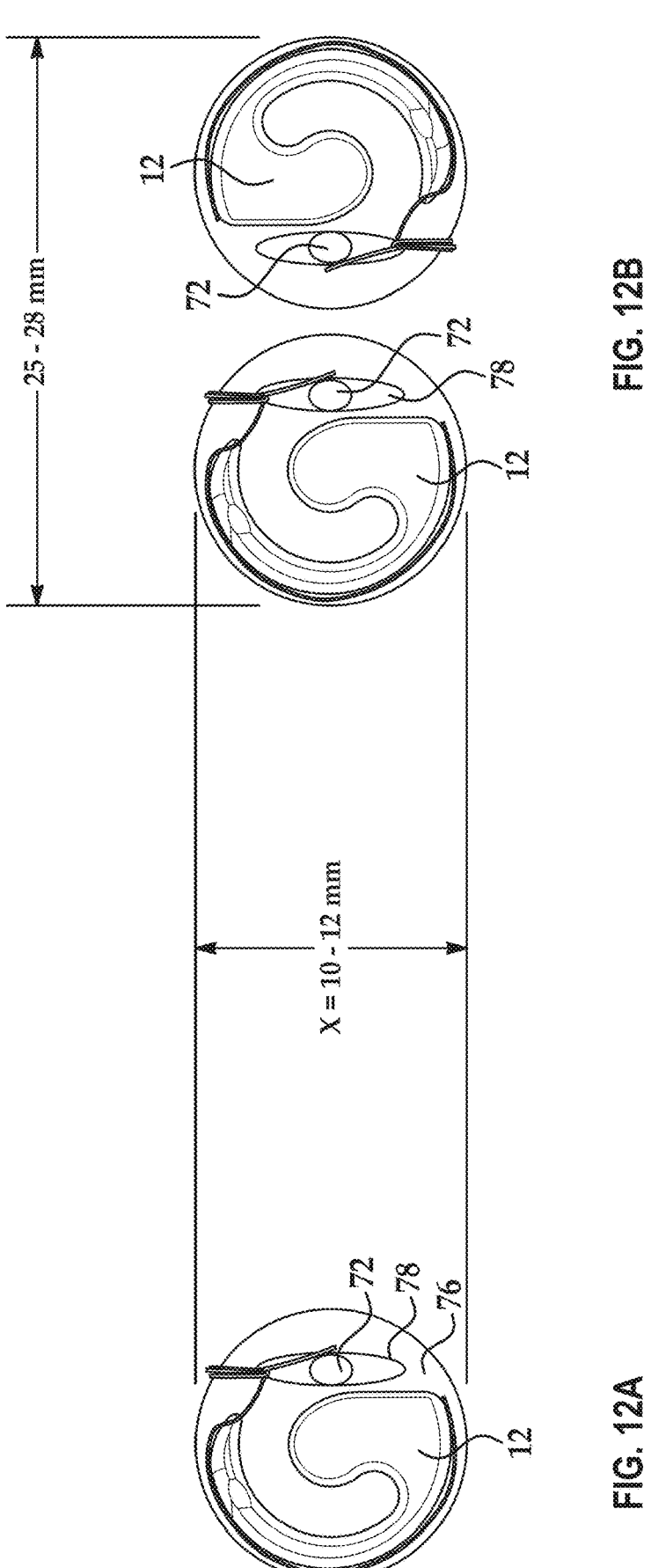
FIGS. 12A and 12B illustrate the stitch plate footprint for various embodiments of the present invention.

This particular concept provides an extremely narrow post housing in the "x" direction (as illustrated in at least FIGS. 1A, 12A and 12B) which is in line with the stitch direction. In one embodiment, dimension of the post housing may be in the range of 10-12 mm (millimeters), of course, dimensions greater or less than this are contemplated to be within the scope of the present invention. In a double needle design the dimension across both post housings may be in the range of 25-28 mm while the dimension in the illustrated "x" direction may be in the range of 10-12 mm, of course, dimensions greater or less than this are contemplated to be within the scope of the present invention. This narrow post housing extends from the cylinder arm up to the top of a looper/stitch plate, which is smaller than all previous known design in this application environment. In one embodiment, the oscillatory chain stitch machine or head 10 can be utilized as a stationary machine whereby a material or product is fed through the machine via one or more feeding devices that are incorporated into the head or machine 10, or the head or machine 10 can be driven via an external drive (e.g. a 6-axis robot) illustrated schematically by box 18 in order to move the sewing head 10 over and around a stationary part.

The head or machine 10 includes a needle bar assembly 20 which is driven by an upper driveshaft 22 operatively coupled to a motor 24 for driving the upper driveshaft 22. An intermediate shaft 26 is also operatively coupled to the upper driveshaft 22 via a belt 28 or any equivalent device such that rotational movement of the upper driveshaft will also cause rotational movement of the intermediate shaft. The intermediate shaft 26 is also operatively coupled to a downshaft assembly 30 and the downshaft assembly 30 is operatively coupled to the cylinder arm assembly 16 which in turn is operatively coupled to the oscillatory butterfly looper 12 via post assembly 14.

Additionally, the head 10 can have an adjustable design such that it may be reconfigured to accommodate a variety of different part shapes and sizes through the use of a reconfigurable lower arm assembly 32 (illustrated schematically in at least FIG. 2), which consists of an adjustable downshaft position in combination with interchangeable cylinder arm shaft and housing assemblies 16 each having different lengths in combination with interchangeable downshaft assemblies 30 having different lengths. As such and as illustrated in at least FIG. 2, vertical clearance between the upper and lower portions of the head can also be adjusted (with or without cylinder arm extensions) via the use of interchangeable downshaft assemblies 30 and looper shaft/housing components (e.g., interchangeable cylinder arm shaft and housing assemblies 16).

For example, a first downshaft assembly 30 may be directly coupled to the intermediate shaft 26 in a housing 34 of an upper portion 36 of the machine or head 10. Thereafter, a second downshaft assembly 30' (illustrated in phantom in FIG. 2) can be operatively coupled to a lower portion of the first downshaft assembly 30 in order to extend the length of the combined downshaft assemblies which in turn will locate the oscillatory looper 12 further away from the needle bar assembly 20 of the head 10.

Figures 1, 1A:
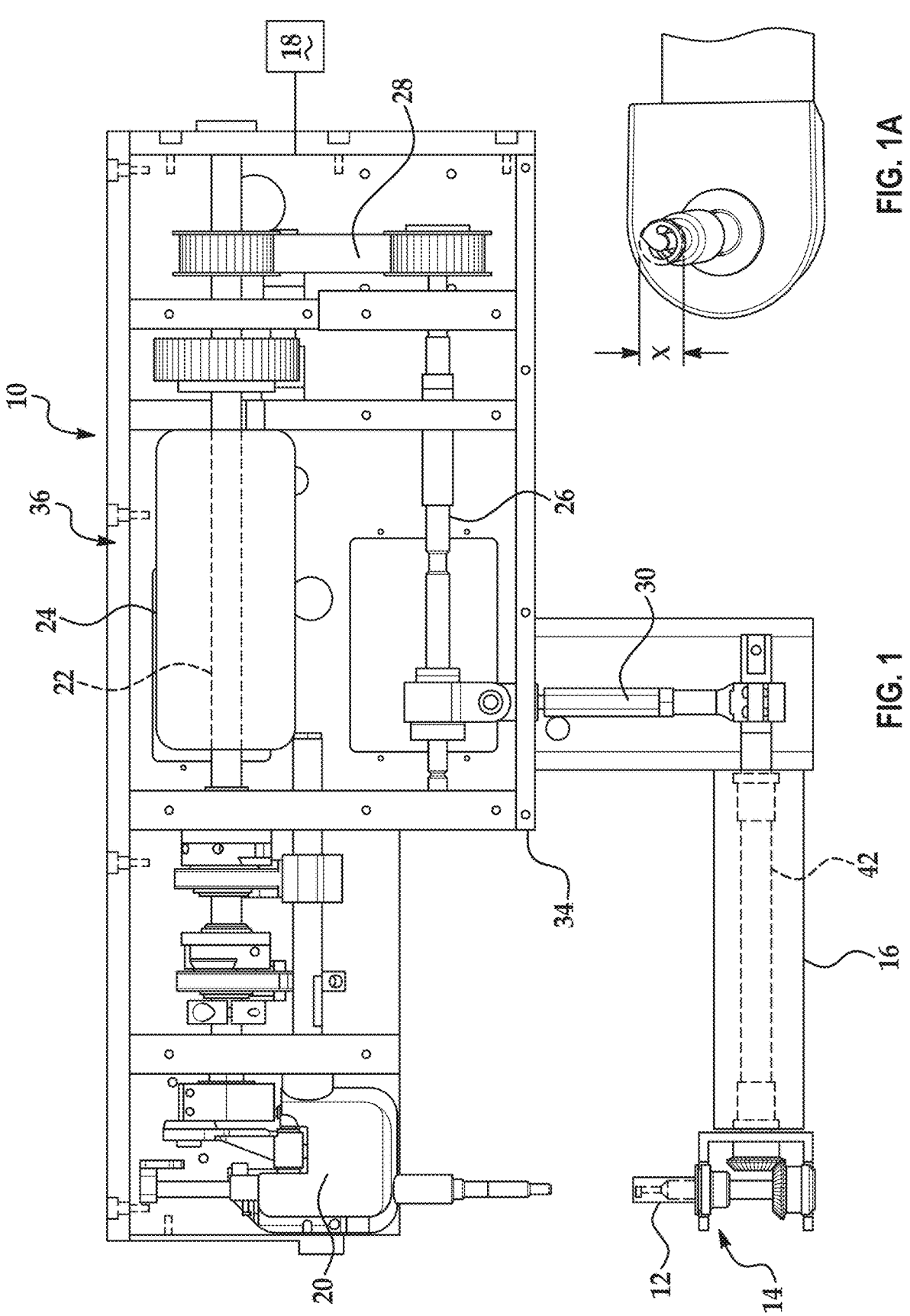
FIG. 1 is a cross-sectional of an oscillatory chain stitch machine in accordance with an exemplary embodiment of the present invention.
FIG. 1A is a perspective view of an oscillatory butterfly looper in accordance with one non-limiting embodiment of the present invention.
Figure 2:
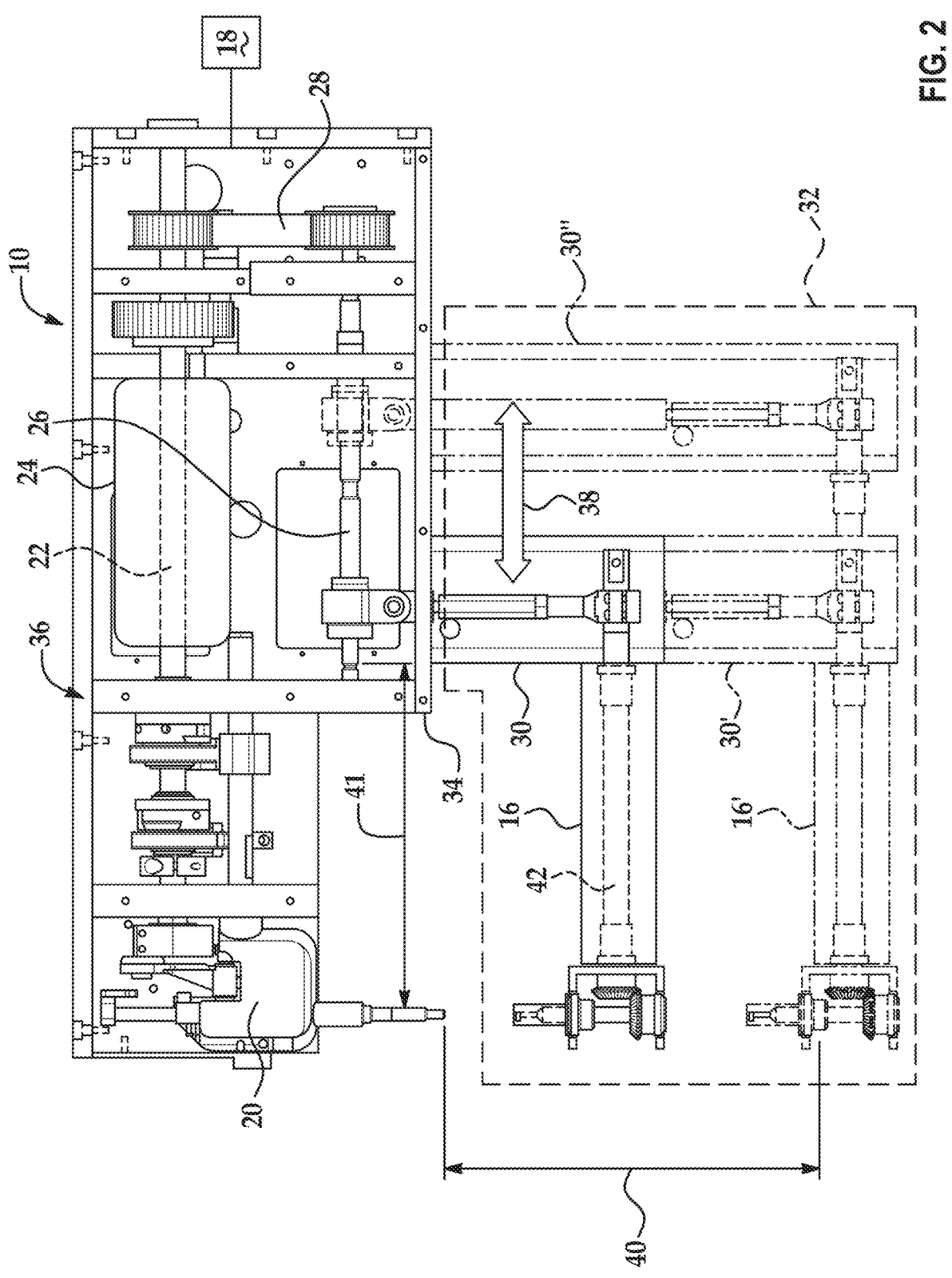
FIG. 2 is a cross-sectional of an oscillatory chain stitch machine with an adjustable lower assembly in accordance with an exemplary embodiment of the present invention.
Figures 3, 3A:
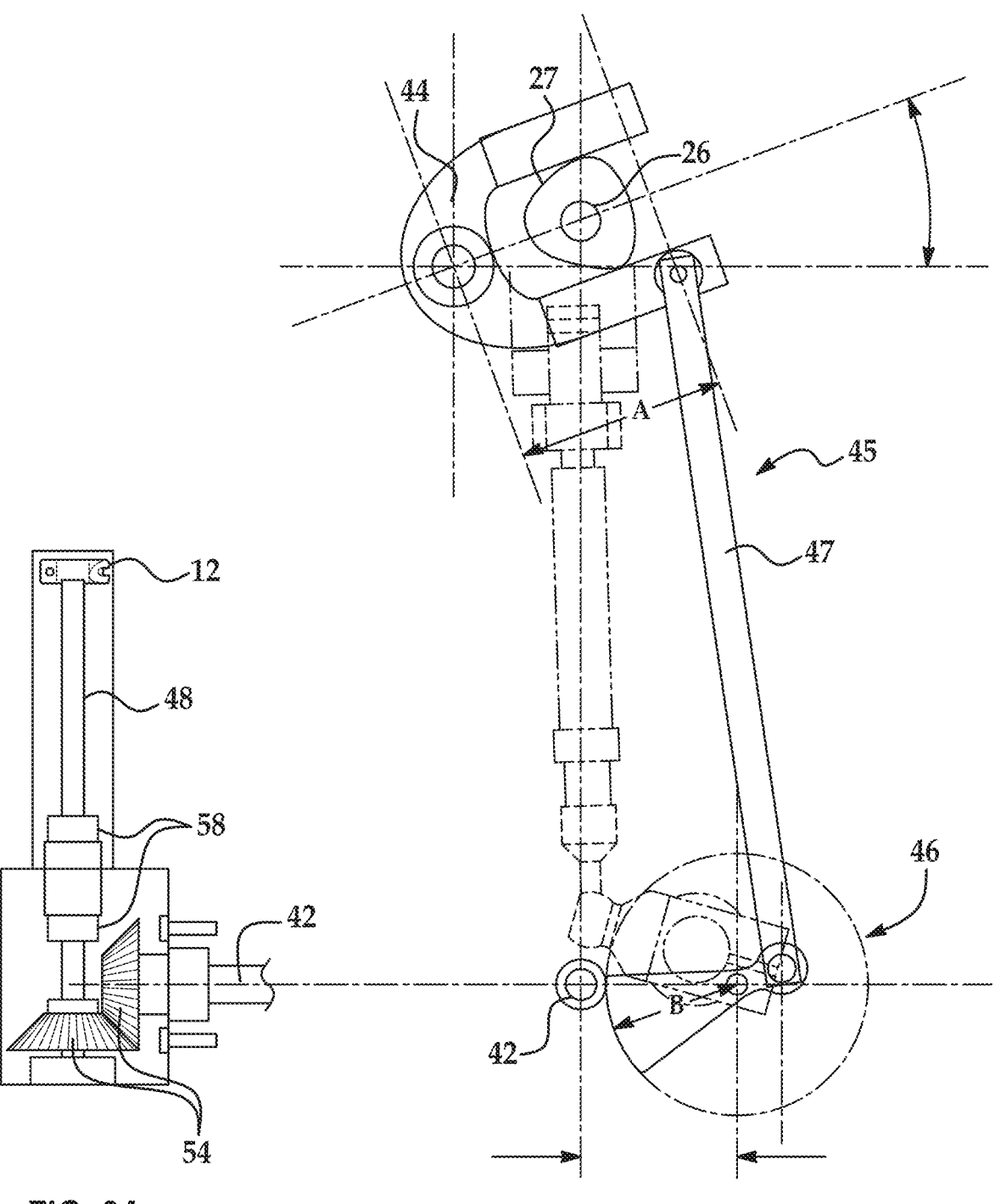
FIG. 3 is a cross-sectional of an oscillatory looper drive unit in accordance with an exemplary embodiment of the present invention.
FIG. 3A is a cross-section view of a combination post and looper assembly.

In addition, the housing 34 and intermediate shaft 26 may also be configured to be coupled to the longer downshaft assembly 30" (also illustrated in phantom in FIG. 2). This allows the location of the downshaft assembly to be moved in the direction of arrows 38, which in turn allows the downshaft assembly 30" to be used with a cylinder arm shaft and housing assembly 16' (also illustrated in phantom in FIG. 2). This assembly 16' may have a longer length than assembly 16 in order to be used with assembly 30". Accordingly, interchangeable cylinder arm shaft and housing assemblies 16, 16' in combination with interchangeable downshaft assemblies 30, 30', 30" as well as interchangeable post components (e.g., looper shaft extensions and housings) allows for multiple configurations and dimensions to be provided as each of the components are interchangeably attachable to each other. Still further and as will be discussed herein a double post oscillatory looper design may be used in combination with any of the disclosed combination of assemblies.

Accordingly, these embodiments allow a distance 40 between the end of needle bar assembly 20 and cylinder arm 16 to be variable, as well as a distance 41 between the end of the needle bar assembly 20 and the downshaft assembly 30, which in turn allows the head or machine 10 to accommodate parts of various sizes.

The description and illustrations referred to above and below refer to a sewing head 10 that can be manipulated over and around a stationary part in an automated fashion but are applicable to stationary machine as well.

As mentioned above, the head 10 construction includes an upper shaft 22 that is driven by a servo motor 24. The upper shaft 22 controls movement of the needle bar assembly 20 and a walking foot which are both located in the upper portion or upper head of the head 10. The upper shaft 22 also drives an intermediate 26 and a lower shaft 42 through a series of belts, pulley and gears which convert constant rotary motion into oscillatory motion. The oscillatory motion is required to properly coordinate the movement of the looper 12 relative to the needle bar assembly 20.

In one embodiment, the oscillatory motion consists of rotation of the looper in a clockwise and counterclockwise movement, as well as acceleration and deceleration of the looper at various times during this movement. One possible non-limiting possible configuration for providing this movement and acceleration and deceleration is shown in at least FIG. 3. The intermediate shaft or intermediate drive shaft 26 has a cam 27 that converts rotary motion into variable speed oscillatory motion in conjunction with a cam fork 44 which in turn drives the output shaft or lower shaft 42 through a series of linkages and gears generally referred to by reference numeral 45.

For example, a gear and sector assembly 46 coupled to the cam fork 44 via a linkage 47 causes oscillatory movement of the output shaft 42 and ultimately a looper shaft 48 which is operatively coupled to the looper 12. As such, the configuration of the gearing determines the rotational travel distance of the looper 12, which in one embodiment may be 220 degrees of rotation in one direction and then back again. Of course, degrees of rotation greater or less than 220 degrees are also understood to be within the scope of various embodiments of the present invention. It being understood that the means of driving the oscillatory looper 12 is not limited to the description above and can be reconfigured accordingly to achieve the same effect.

The looper post assembly 14 may have a single looper 12 (see at least FIG. 4) or the looper post assembly may be configured to have a double looper hereinafter referred to as double looper post assembly 50 (see at least FIG. 5), depending on the particular stitch configuration desired. As mentioned above, the single looper or double looper may be used in any of the combinations disclosed herein. In applications where the double looper post assembly 50 is employed the head 10 may also be configured to have a second needle added to the needle bar assembly 20 in order to provide double stitch patterns.

Figures 4, 5:
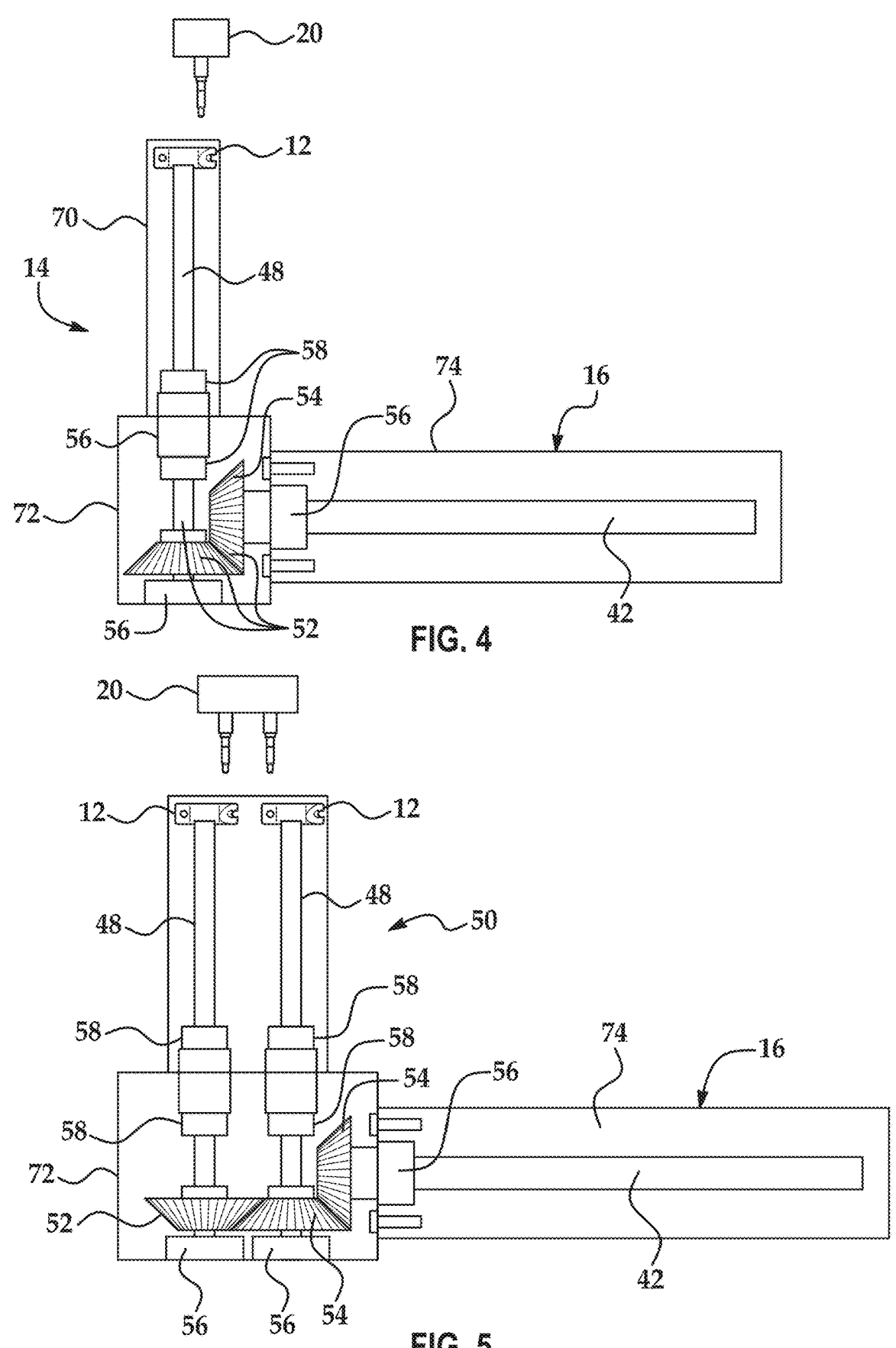
FIG. 4 is a cross-sectional view of an oscillatory looper post design in accordance with an exemplary embodiment of the present invention.
FIG. 5 is a cross-sectional view of an oscillatory looper post design in accordance with an alternative exemplary embodiment of the present invention.

Referring back now to FIG. 4, the looper 12 is driven by looper shaft 48 via a bevel gear 52 meshingly engaged with a bevel gear 54 of the lower shaft 42. Also shown in FIG. 4 are bushings 56 collar locks 58, a post housing 70, a gear housing 72 and a cylinder arm assembly housing 74 in order to assist with the transference of oscillatory rotational movement of the lower shaft 42 to looper 12. Although and as mentioned above, the configuration illustrated in FIGS. is merely provided as one non-limiting exemplary embodiment and various other means for providing oscillatory movement to the looper 12 are considered to be within the scope of various embodiments of the present invention.

In FIG. 5, a second looper 12, looper shaft 48, collar lock 58 and bevel gear 52 along with bushing 56 are provided in an extended gear housing 72 in order to drive a pair of loopers 12.

One non-limiting example of a sequence required to complete a stitch is described below and illustrated in at least FIGS. 6-11. In step 1 (FIG. 6), the looper 12 is in its full counterclockwise rotational position or at its beginning of rotation and a needle 72 of the needle bar assembly 20 is at the bottom (bottom dead center BDC) of its stroke.

Figures 6, 6A:
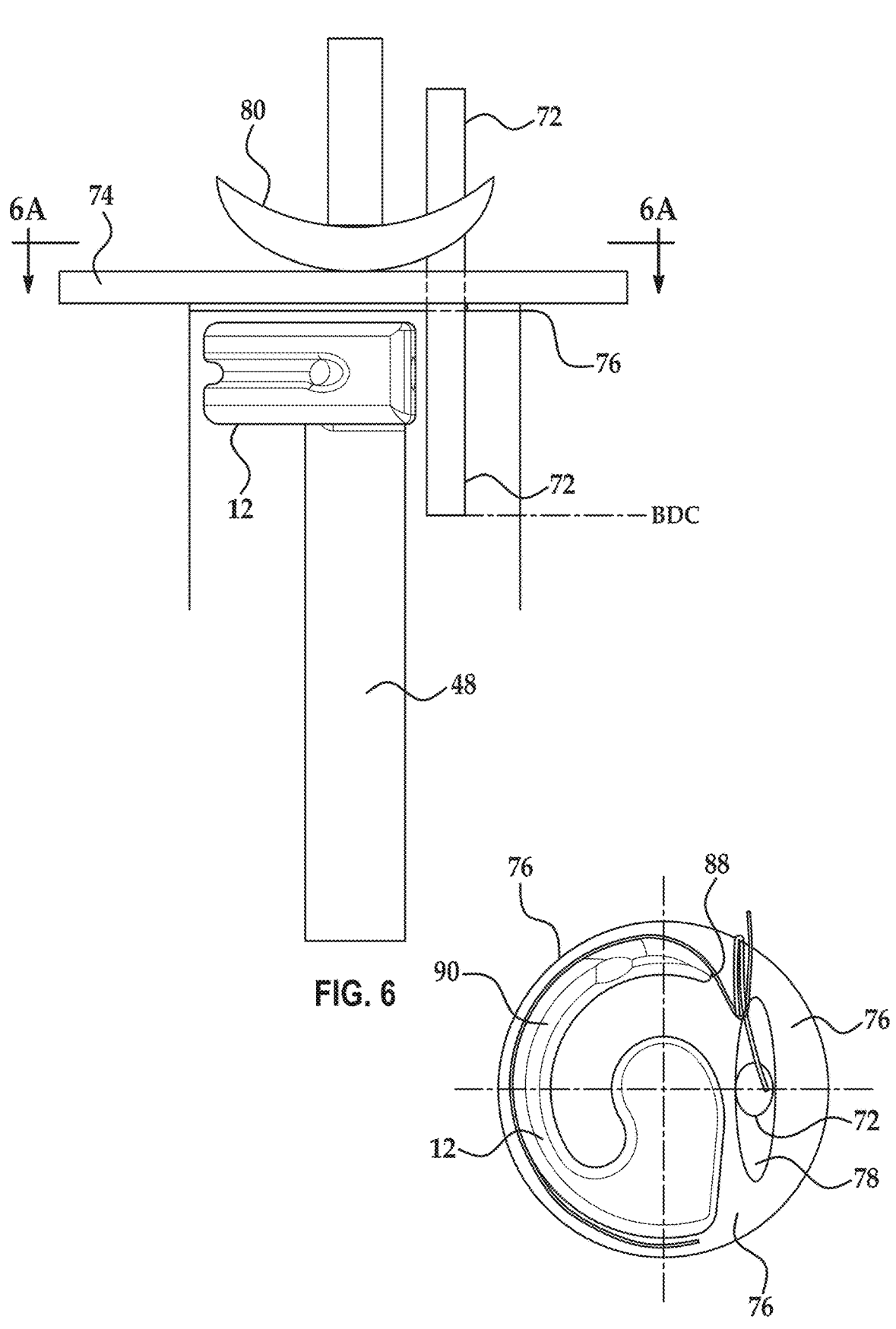
FIG. 6 is a view illustrating the formation of a stitch in accordance with an embodiment of the present invention.
FIG. 6A is a view along lines 6A-6A of FIG. 6.

Also illustrated in at least FIGS. 6-11 is the part or a portion thereof 74 being stitched by the head 10, a stitch plate 76 and an opening or hole 78 in the stitch plate 76 that allows the needle 72 to enter and exit therefrom. At least a portion of the stitch plate 76 may be located around housing 70 of the looper post assembly 14. Also shown is a walking foot 80 of the needle bar assembly 20. The walking foot 80 is operatively coupled to the upper drive shaft 22 in order to provide the desired reciprocal movement walking foot 80 as the needle 72 moves up and down between its top dead center location and its bottom dead center location. In FIG. 6, the needle 72 is at a bottom of its stroke or (bottom-dead-center) and the looper 12 is at its beginning of rotation. In addition, the walking foot 80 is in contact with the material 74 but applying little pressure thereto. FIG. 6A is also a view along lines 6A-6A of FIG. 6.

Figures 7, 7A:
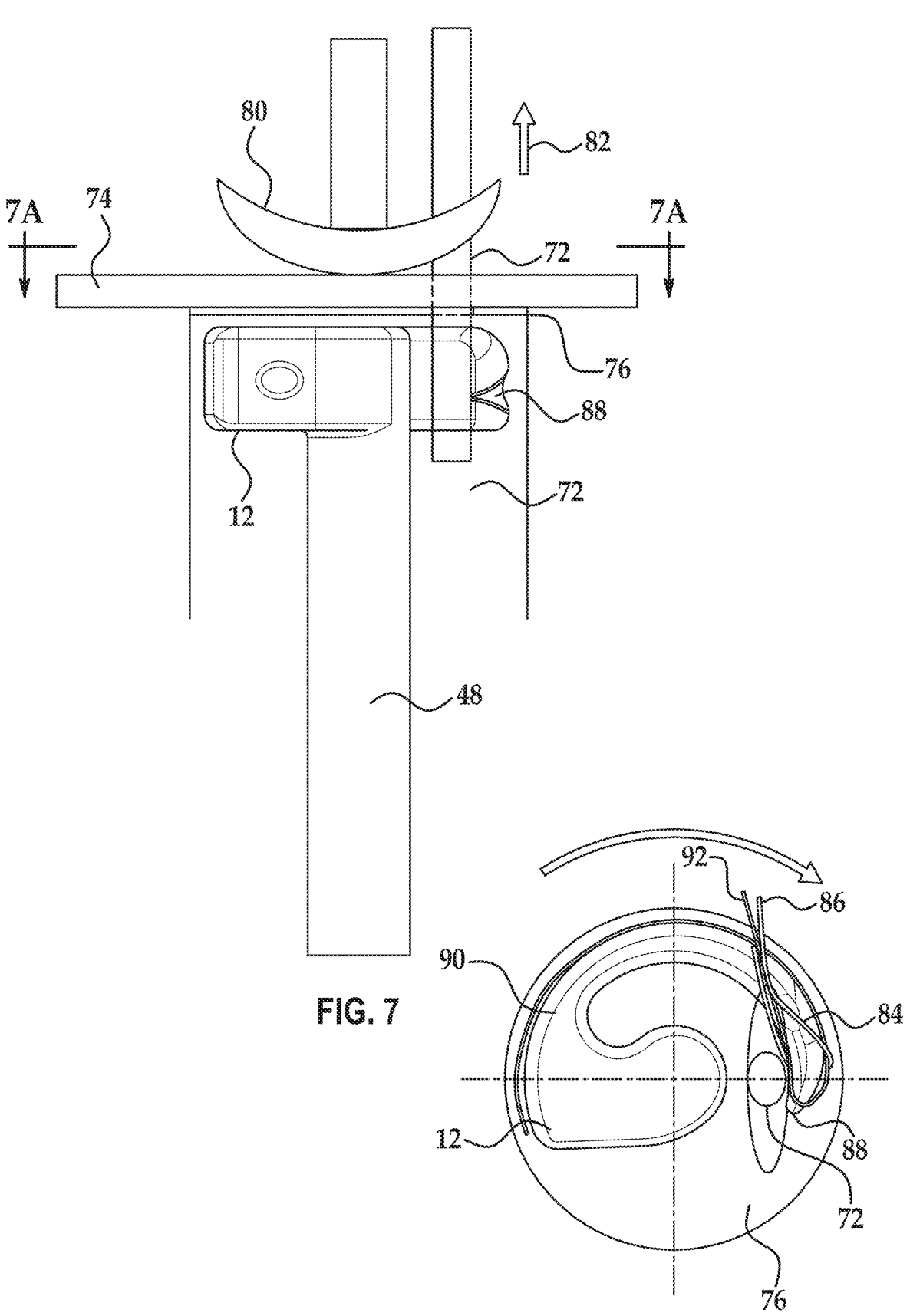
FIG. 7 is a view illustrating the formation of a stitch in accordance with an embodiment of the present invention.
FIG. 7A is a view along lines 7A-7A of FIG. 7.

In step 2 (FIG. 7), the needle 72 begins its upward motion in the direction of arrow 82, creating a loop 84 in a top thread 86 which is positioned between the tip of the needle 72 and the backside of the previous part 74. Concurrently, a tip 88 of the looper 12 moves clockwise, with respect to the view illustrated in the FIGS, between the thread loop 84 and the needle 72. In addition, the walking foot 80 applies a slight pressure to ensure the material 74 remains in contact with the stitch plate 76 as the needle 72 retracts from the material 74. FIG. 7A is a view along lines 7A-7A of FIG. 7.

Figures 8, 8A:
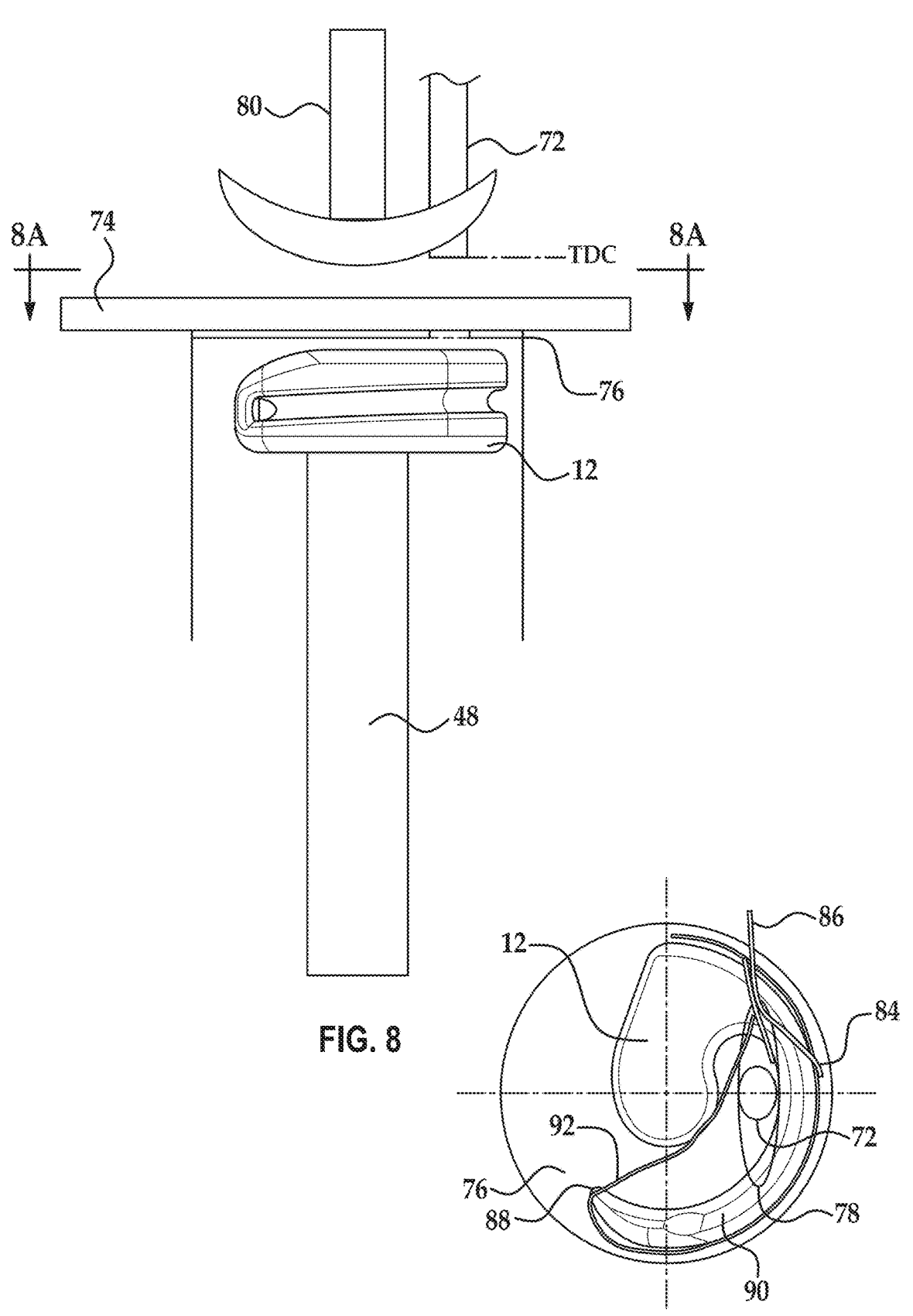
FIG. 8 is a view illustrating the formation of a stitch in accordance with an embodiment of the present invention.
FIG. 8A is a view along lines 8A-8A of FIG. 8.

In step 3 (FIG. 8), the needle 72 has exited the part 74 and is positioned in its fully retracted (top dead center TDC) position. The looper 12 has moved to its fully clockwise rotational position or max rotational position, with respect to the view illustrated in the FIGS, with the top thread loop 84 fully seated on an arm 90 of the looper 12. The walking foot 80 is also raised off the part 74 and begins advancement to the next point of needle penetration on the part 74. FIG. 8A is a view along lines 8A-8A of FIG. 8.

Figures 9, 9A:
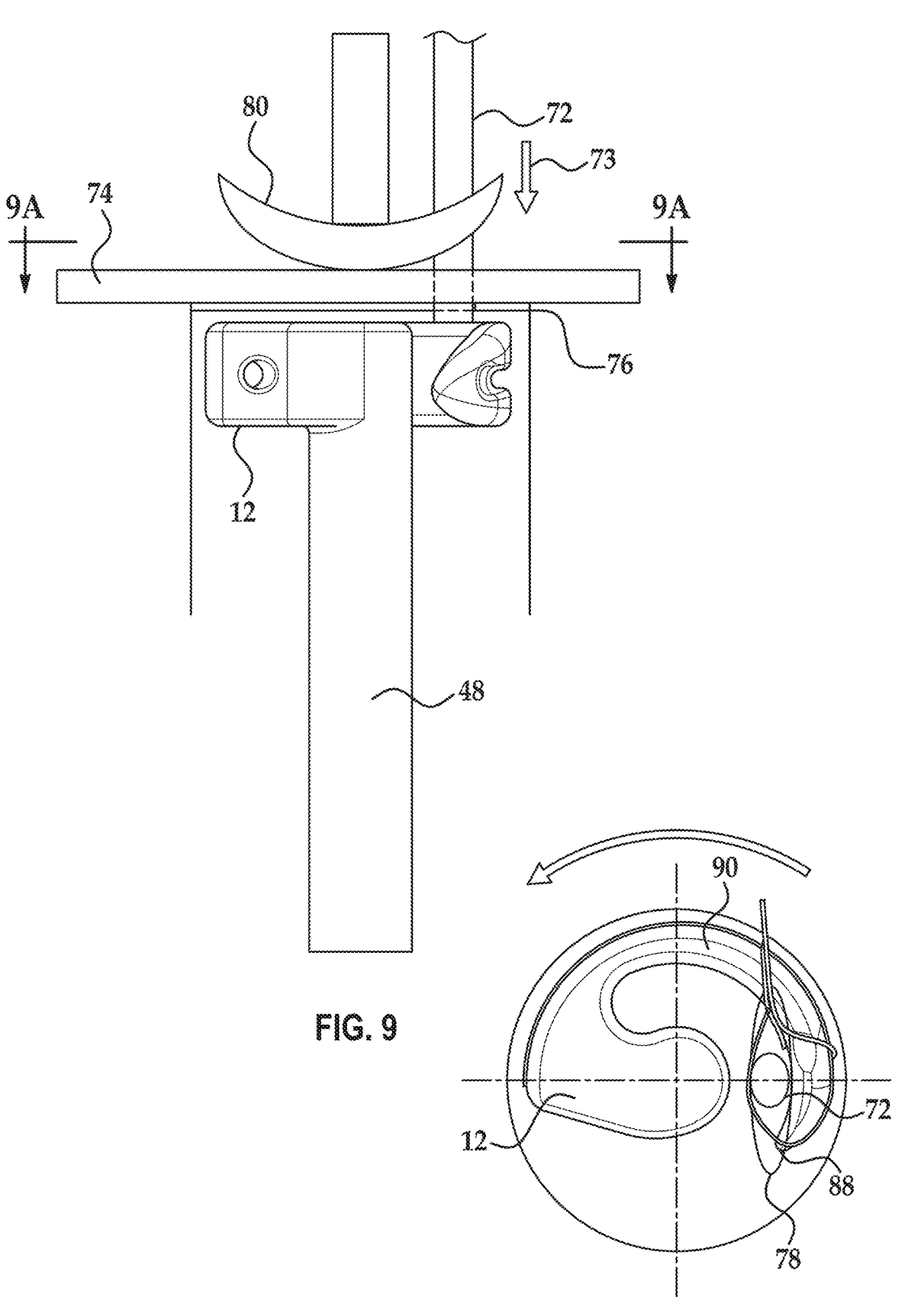
FIG. 9 is a view illustrating the formation of a stitch in accordance with an embodiment of the present invention.
FIG. 9A is a view along lines 9A-9A of FIG. 9.

In step 4 (FIG. 9), the needle 72 has moved downward in the direction of arrow 73 and again has penetrated the part 74 and is also engaging the looper 12. The needle 72 is now on a down stroke and moves between a lower or bottom thread 92 and the looper 12 as the looper 12 turns counterclockwise, with respect to the view illustrated in the FIGS. The walking foot 80 moved downward in the direction of arrow 73 to be in slight contact with the material or part 74 as the needle 72 enters the material. FIG. 9A is a view along lines 9A-9A of FIG. 9.

Figures 10, 10A:
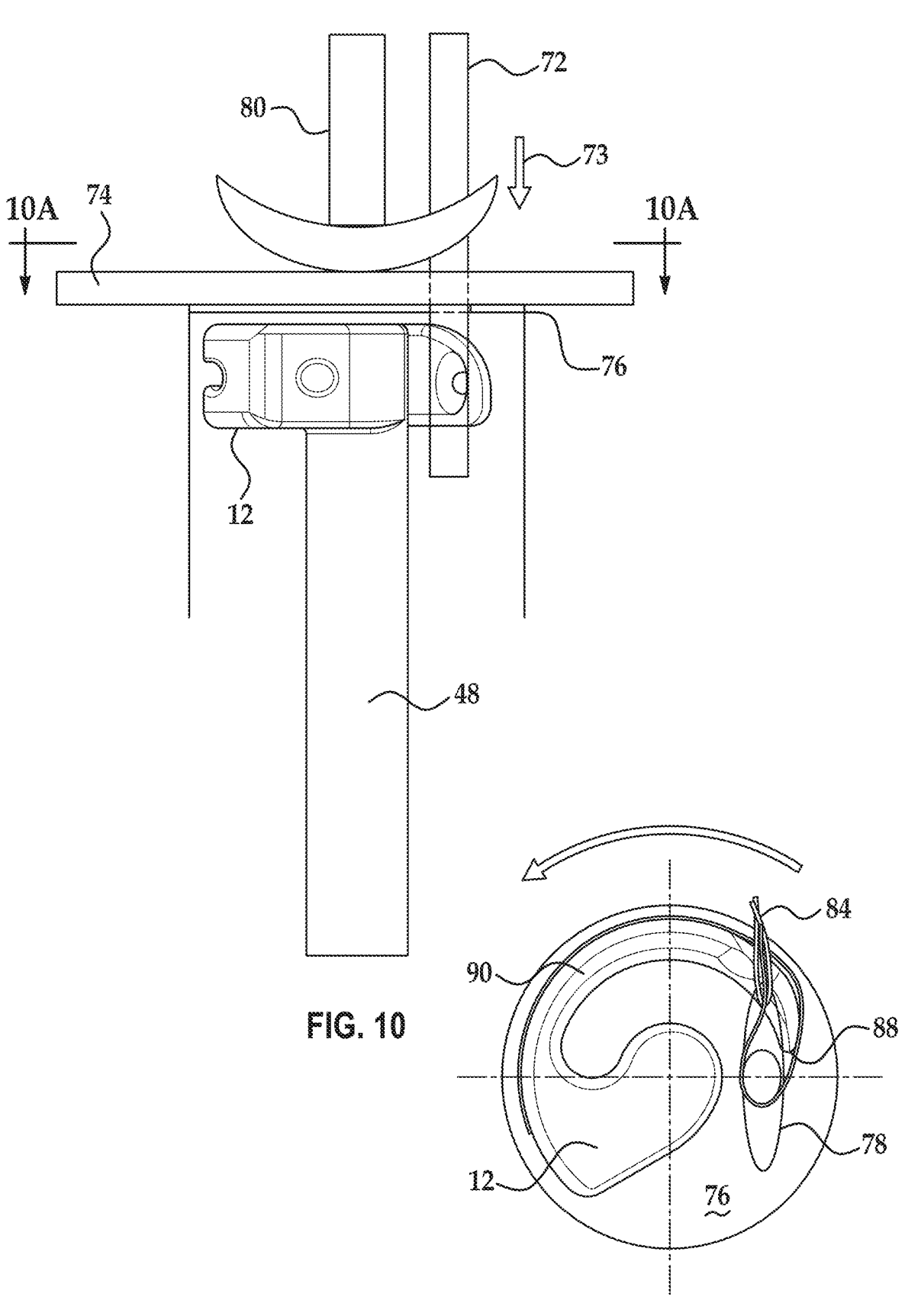
FIG. 10 is a view illustrating the formation of a stitch in accordance with an embodiment of the present invention.
FIG. 10A is a view along lines 10A-10A of FIG. 10.

In step 5 (FIG. 10), the needle 72 continues to move downward in it down stroke in the direction of arrow 73 as the looper 12 continues its counterclockwise rotation, with respect to the view illustrated in the FIGS, releasing the top thread loop 84. The top thread 86 is released by the looper 12 in step 5 of FIG. 10. FIG. 10A is a view along lines 10A-10A of FIG. 10.

Figures 11, 11A:
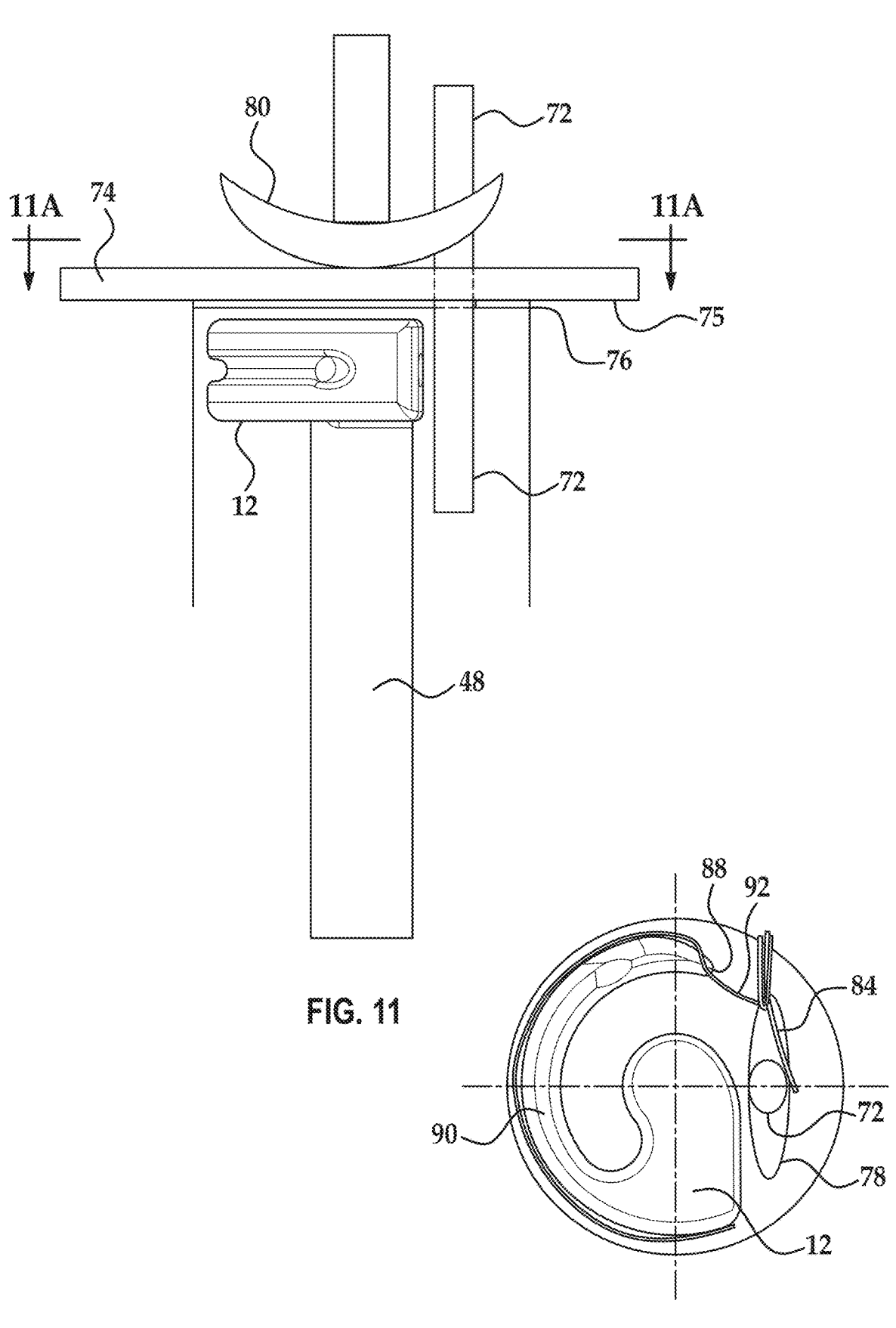
FIG. 11 is a view illustrating the formation of a stitch in accordance with an embodiment of the present invention.
FIG. 11A is a view along lines 11A-11A of FIG. 11.

In step 6 (FIGS. 11 and 11A, wherein FIG. 11A is a view along lines 11A-11A of FIG. 11), the needle 72 reaches the bottom of its stroke (bottom-dead-center) and the looper 12 reaches its end position of counter clockwise rotation, with respect to the illustrated views and the top thread 84 is pulled tight against a backside 75 of the material 74 while pulling the bottom thread 92 along as the stitch is completed. Accordingly, the top thread loop 84 is pulled upward, which pulls the lower thread 92 along, as the sewing head 10 moves forward relative to the part 74, finishing the stitch.

The oscillatory looper design described herein requires minimal stitch plate depth to house the loopers 12 (see at least FIG. 12), as the loopers 12 rotate in a plane parallel to the part 74 (See at least FIGS. 6-11A) to form the stitch versus fore/aft looper motion in a plane perpendicular to the part, which is more commonly found on chain stitch sewing machines. The stitch plate depth is dictated by the minimal looper diameter required to process the desired thread size. This compact design enables sewing of thru-plane radii on formed parts that was previously not possible with more conventional equipment (see for example FIGS. 13 and 14).

Figure 13:
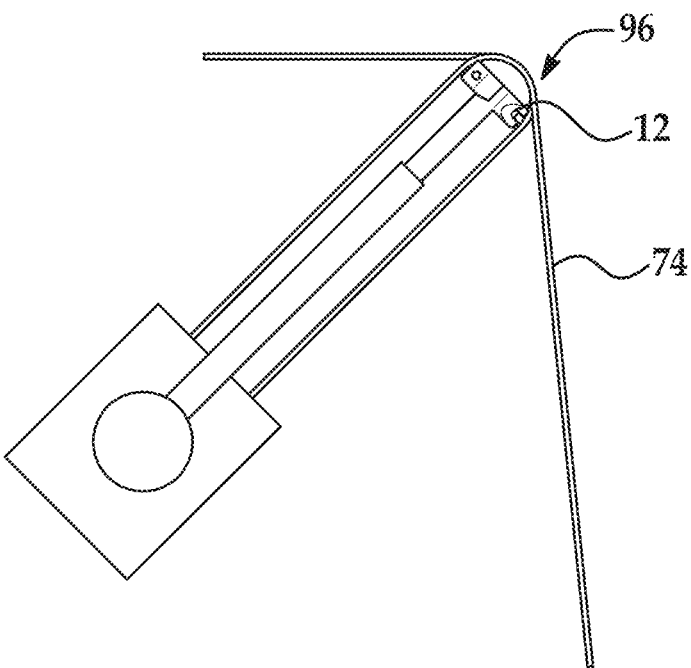
FIG. 13 illustrates a hook looper apparatus in a corner of a part.
Figure 14:
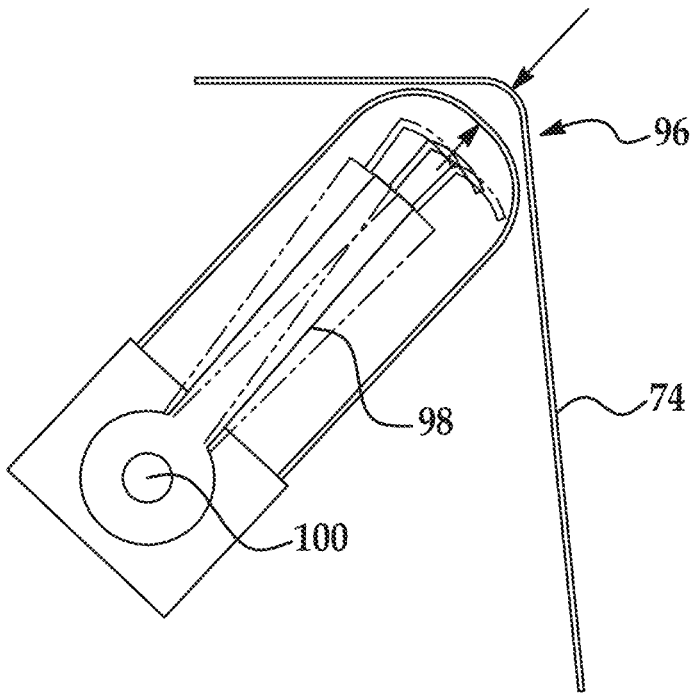
FIG. 14 illustrates an oscillatory looper in accordance with an exemplary embodiment of the present invention.

In FIG. 13, a corner 96 of a part 74 is able to be stitched by the head 10 since the looper 12 is able to be located much closer to the backside of the corner 96 of the part 74. This is due to a minimal or no clearance between the stitch plate 76 and the part 74 or corner 96 to ensure a consistent uniform stitch appearance especially at corner 96. In contrast and referring to FIG. 14, a looper arm 98 rotates about an axis 100, which is perpendicular as opposed to parallel to the backside of the part 74 being stitched. In FIG. 14, there is an excessive clearance between the stitch plate 76 and the part 74 or corner 96 and as such an irregular stitch length or skipped stitches may result proximate to corner 96 due to this excessive clearance. As such, various embodiments of the present invention permit stitching in tight corners of a part 74. Thus, the in part radii can now being dictated by visual appearance instead of machine/sewing process limitations. Additionally and through the use of an oscillatory looper 12, both a top and bottom thread are used to form a stitch.

The sewing machine post, which originates at the end of the cylinder arm 16 and extends upward therefrom terminates at the top of the stitch plate 76. The stitch plate 76 and/or the dimension of the post or post housing 76 in the "x" direction as illustrated in the attached FIGS, is only limited by the diameter of the looper 12 itself. No other mechanism is present in the post or post housing 70 to increase its size at any point along the height of the post or post housing 70, which allows the post or post housing 70 and its stitch plate 76 to be inserted into small areas such as corner 96 or any other small hard to reach areas with a minimal amount of clearance between the stitch plate 76 and the backside of the part being stitched thereby resulting in a more effective or efficient stitch pattern.

It is also understood that the lower shaft (output shaft) can be adjusted relative to the looper shaft so that optimal access to the backside of the part is achieved.

Figure 15:
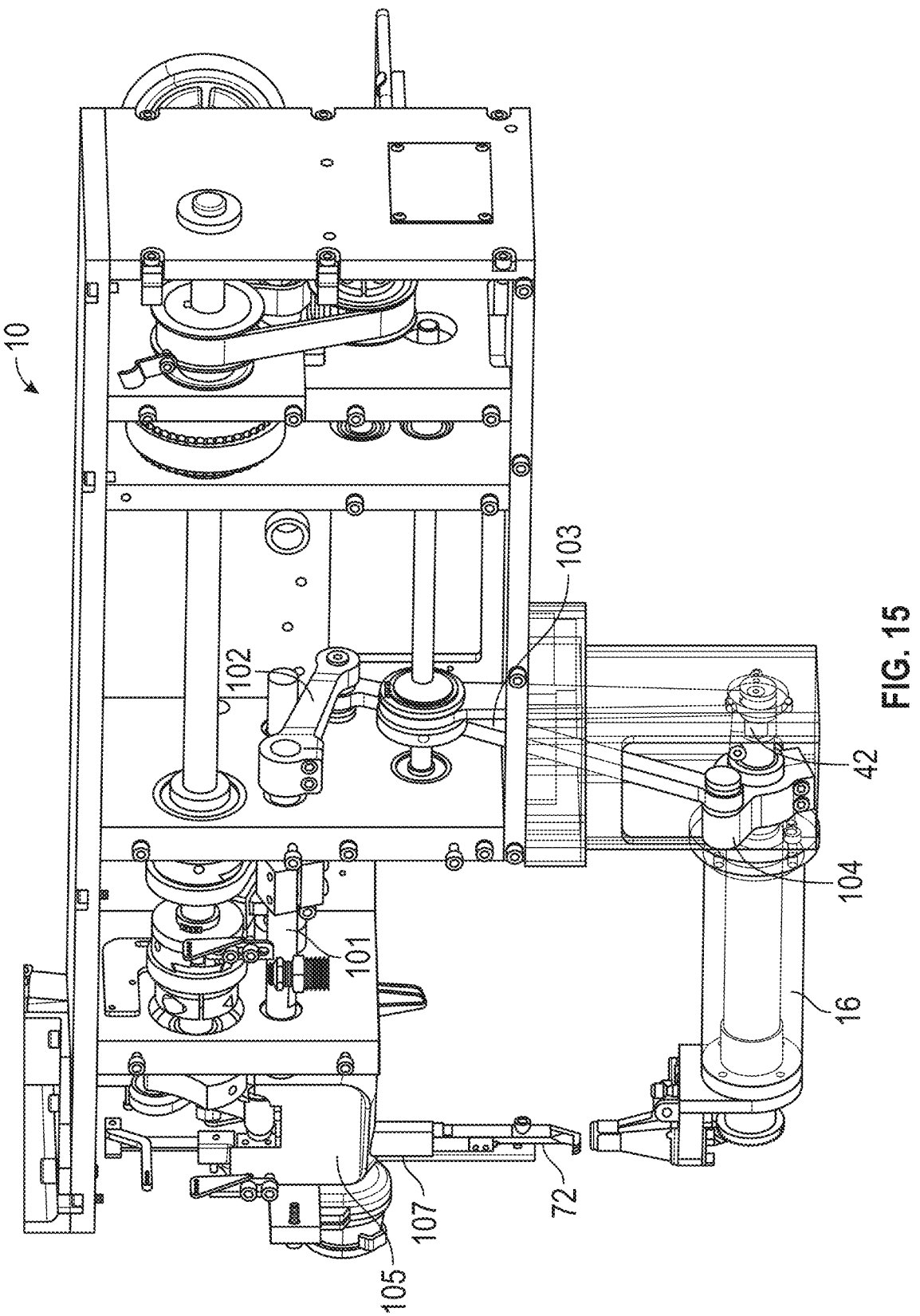
FIG. 15 illustrates one method of introducing a cylinder arm or cylinder arm assembly transport into a head is illustrated.

In FIG. 15, one method of introducing the cylinder arm or cylinder arm assembly transport into the head 10 is illustrated. The cylinder arm or cylinder arm assembly 16 transport may be utilized to maintain the proper relationship between the needle 72 and looper 12 during stitch creation. Attached to a rock frame drive shaft 101 of the head 10 is a cylinder arm drive link 102 which in turn is pivotally connected to a cylinder arm driven link 103. The cylinder arm driven link 103 is pivotally connected to a cylinder arm rotational drive clamp 104, which is connected to the cylinder drive assembly 16. This configuration enables the cylinder arm assembly 16 to rotate about the lower shaft 42 in sequence with the rotation of a rock frame 105 about the rock frame drive shaft 101. Because the rotation of the rock frame 105 about the rock frame drive shaft 101 controls the position of the needle in the direction of sewing, connecting the rotational motion of the cylinder arm assembly 16 to the rock frame drive shaft 101 will ensure the interface of the needle 72 to the looper 12 will always be correct when upper needle bar transport is utilized.

Figure 16C:
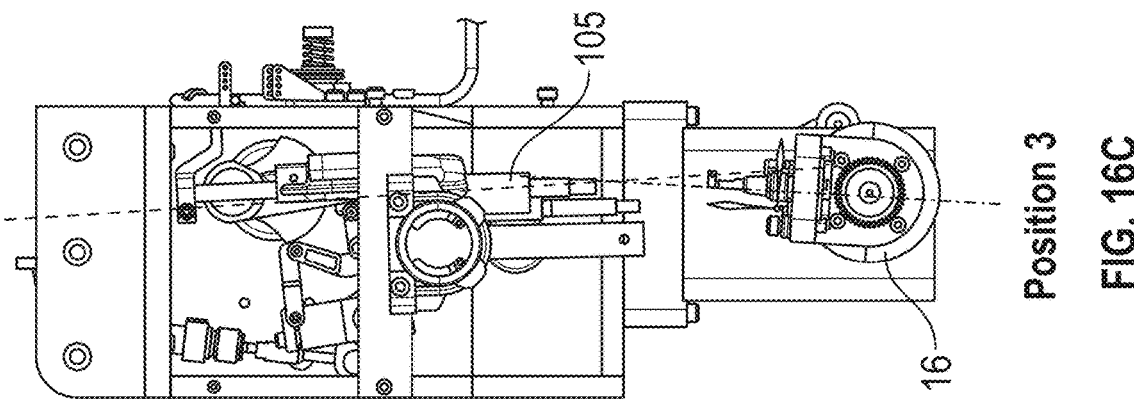
FIGS. 16A-16C illustrate the orientation of a rock frame relative to a cylinder arm at three points during the stitch cycle.
Figure 16B:
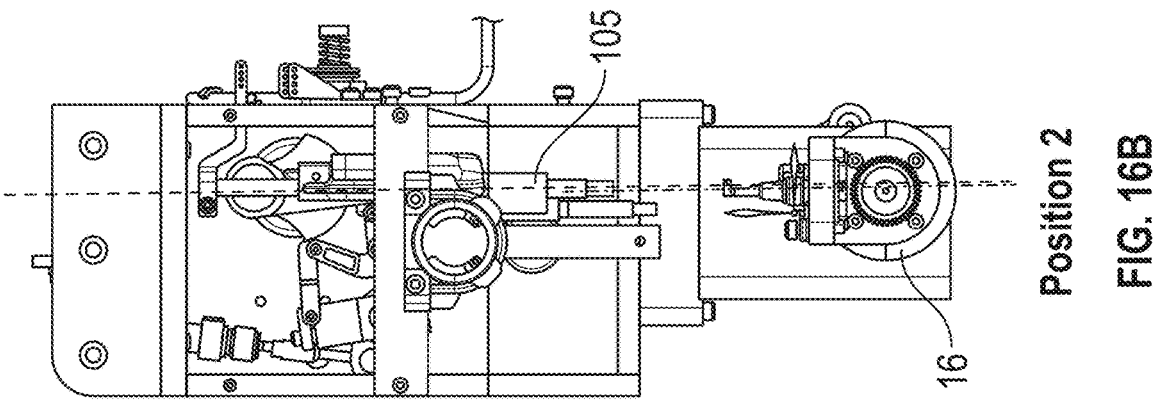
Figure 16A:
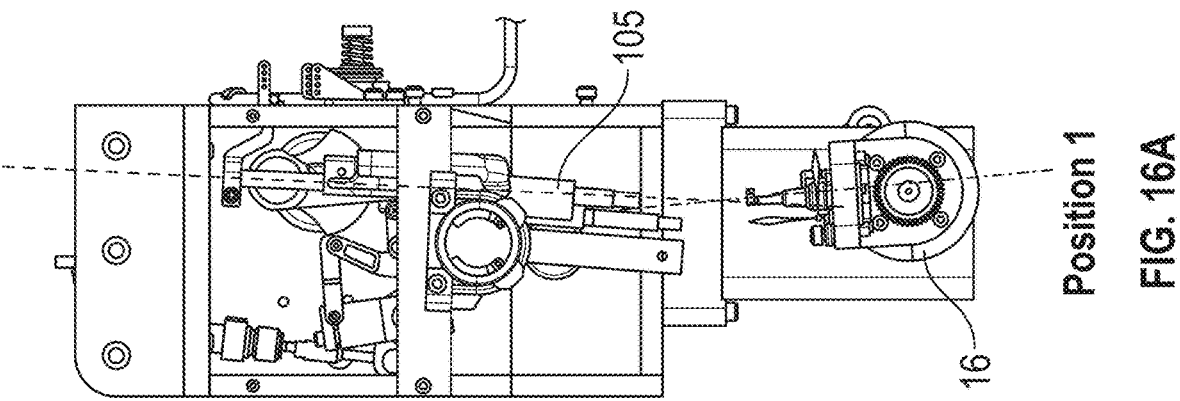

FIGS. 16A-16C illustrate the orientation of the rock frame 105 relative to the cylinder arm 16 at three points during the stitch cycle.

FIGS. 17A-E illustrate the use of a thread brake or brake pad 106 to control the size and stabilize the position of the top thread loop prior to engagement with the looper 12. FIG. 17A illustrates the needle in top dead center (TDC) position with the thread brake 106 retracted, allowing the top thread 86 to move freely through the eye of the needle 72. FIG. 17B indicates a point along the downward motion of a needle bar 107 travel where the thread brake 106 begins to move forward toward the needle bar 107, applying resistance to top thread 86 passage prior to the thread entering the eye of the needle 72. FIG. 17C illustrates full thread brake 106 pressure applied to the thread 86 against the needle bar 107, preventing top thread 86 passage through the eye of the needle 72. As the needle bar continues downward from this point, formation of the top thread loop begins and is held in a proper position until looper 12 pick-up. FIG. 17D illustrates the needle bar 107 at the bottom dead center (BDC) position. FIG. 17E illustrates the needle bar 107 at the point of its upward travel where the looper 12 engages with the top thread loop. It is also at this point where the thread brake 106 normally begins to disengage from the needle bar 107, allowing free passage of the top thread 86 through the eye of the needle 72 once again.

When needle bar 107 is at TDC (see at least FIG. 17A), a spring steel arm 108 is depressed by a roller wheel assembly 109 (as a result of the shape of the spring steel arm). The spring steel arm 108 is secured to the thread brake and is configured to provide a biasing force in the direction of arrow 111.

As the needle bar 107 moves down (and the spring steel arm 108 with it), the roller wheel 109 which does not move eventually reaches a point on the spring steel arm 108 where no deflection occurs at which point the brake pad or thread brake 106 applies pressure, trapping the thread 86 against the needle bar 107. This occurs with the needle bar 107 at approximately 50% of its downward stroke length.

Brake pressure remains applied (spring deactivated) all the way down to BDC of needle stroke and remains applied until approximately 25% of its upstroke distance before brake release begins (spring activation begins).

The thread brake 106 is fully released at 50% needle bar 107 upward stroke and remains released (spring activated) for the balance of the upward needle bar motion to TDC.

Brake engagement and release points noted above are approximate and can be adjusted by moving the position of the roller wheel assembly 109 up or down, depending on the application and thread utilized.

It is of course, understood that other means of brake activation/deactivation are also possible.

Figures 18A, 18B:
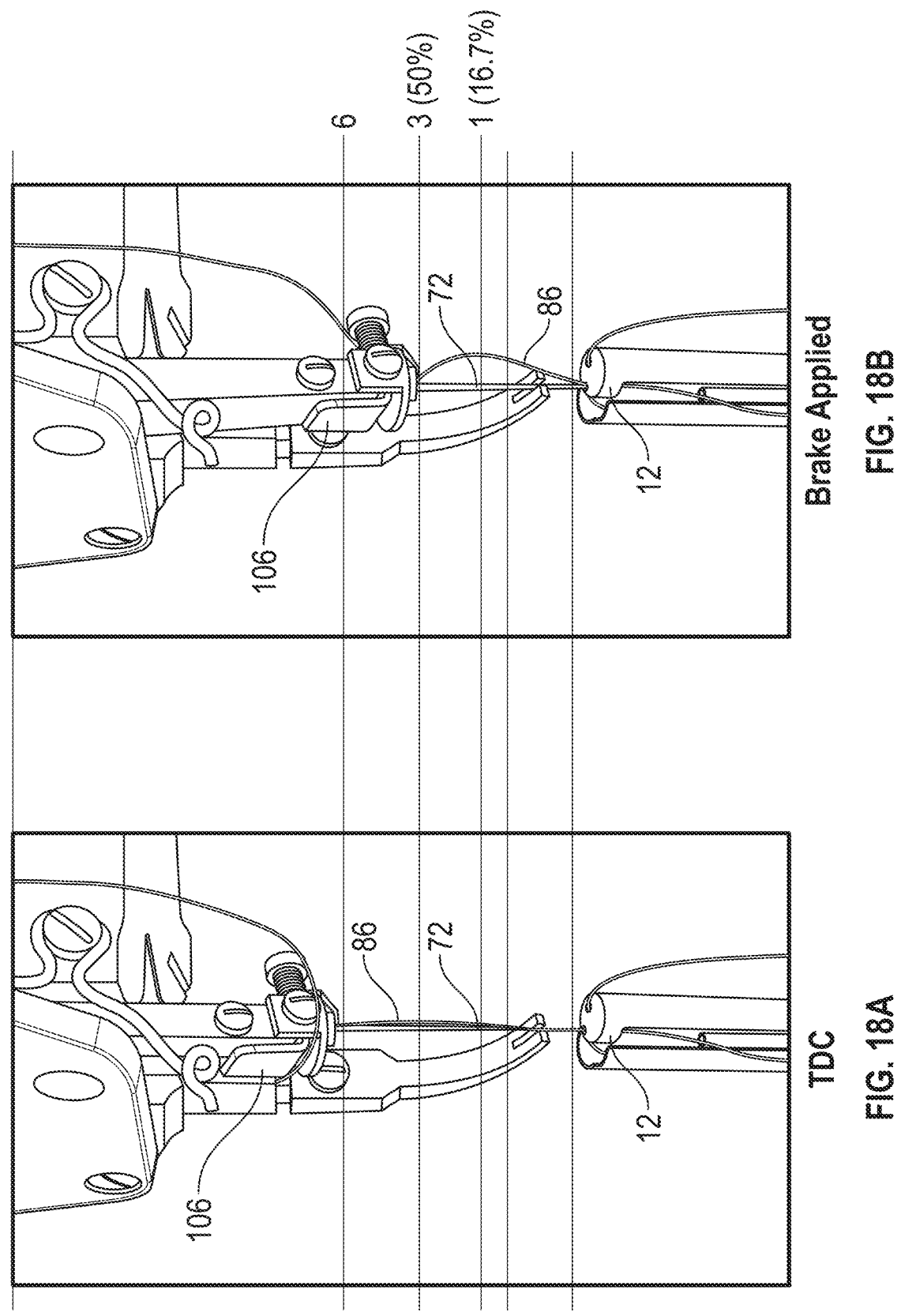
FIGS. 18A-18D also illustrate the use of the thread brake to control the size and stabilize the position of the top thread loop prior to engagement with the looper.
Figures 18C, 18D:
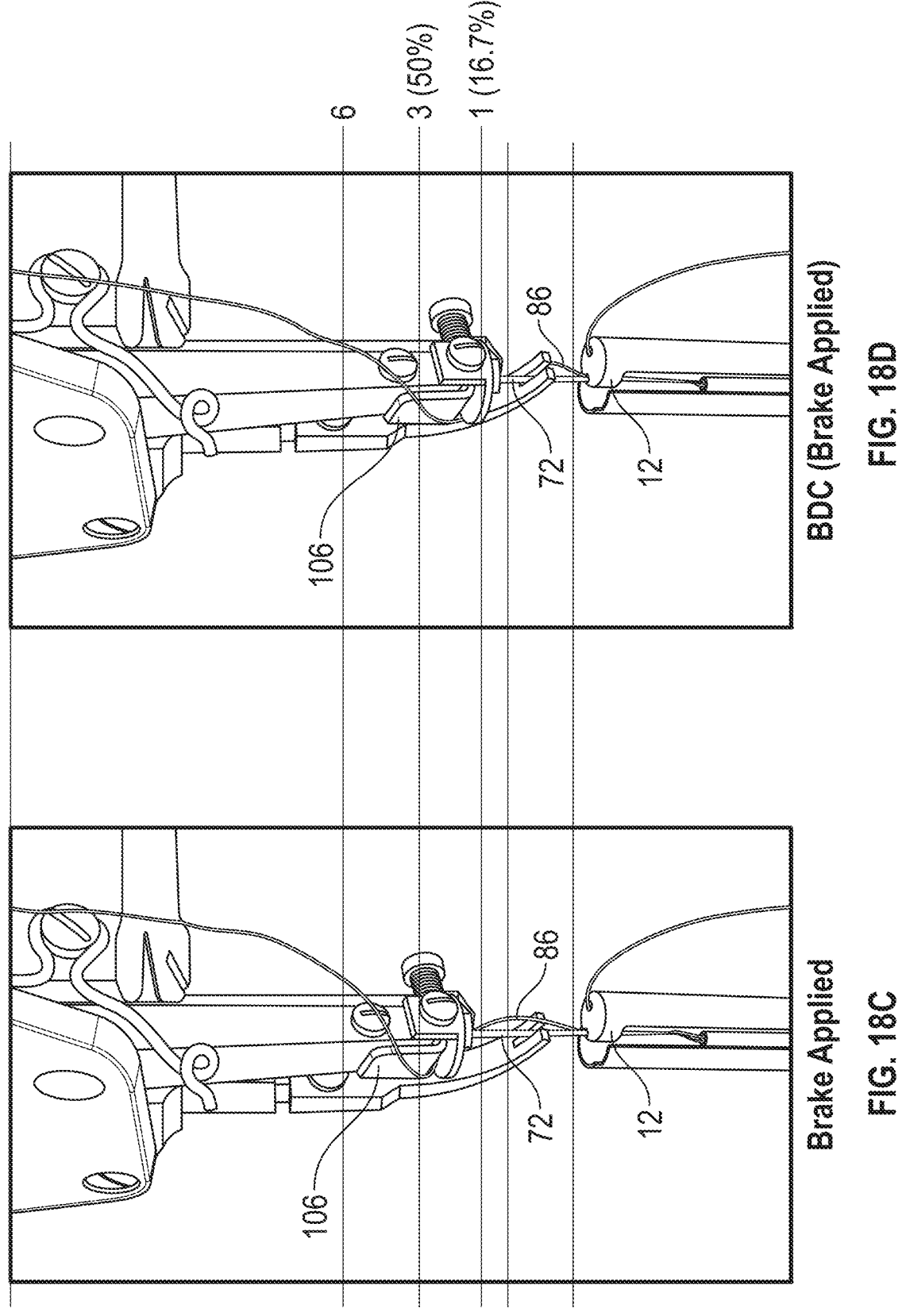

FIGS. 18A-18D also illustrate the use of the thread brake 106 to control the size and stabilize the position of the top thread loop prior to engagement with the looper 12. FIG. 18A illustrates the needle in top dead center (TDC) position with the thread brake 106 retracted, allowing the top thread 86 to move freely through the eye of the needle 72 while FIGS. 18B and 18C illustrate a point along the downward motion of the needle 72 and needle bar 107 where the thread brake 106 has been applied. FIG. 18D illustrates the needle bar 107 at the bottom dead center (BDC) position with the thread brake applied.

Figure 19:
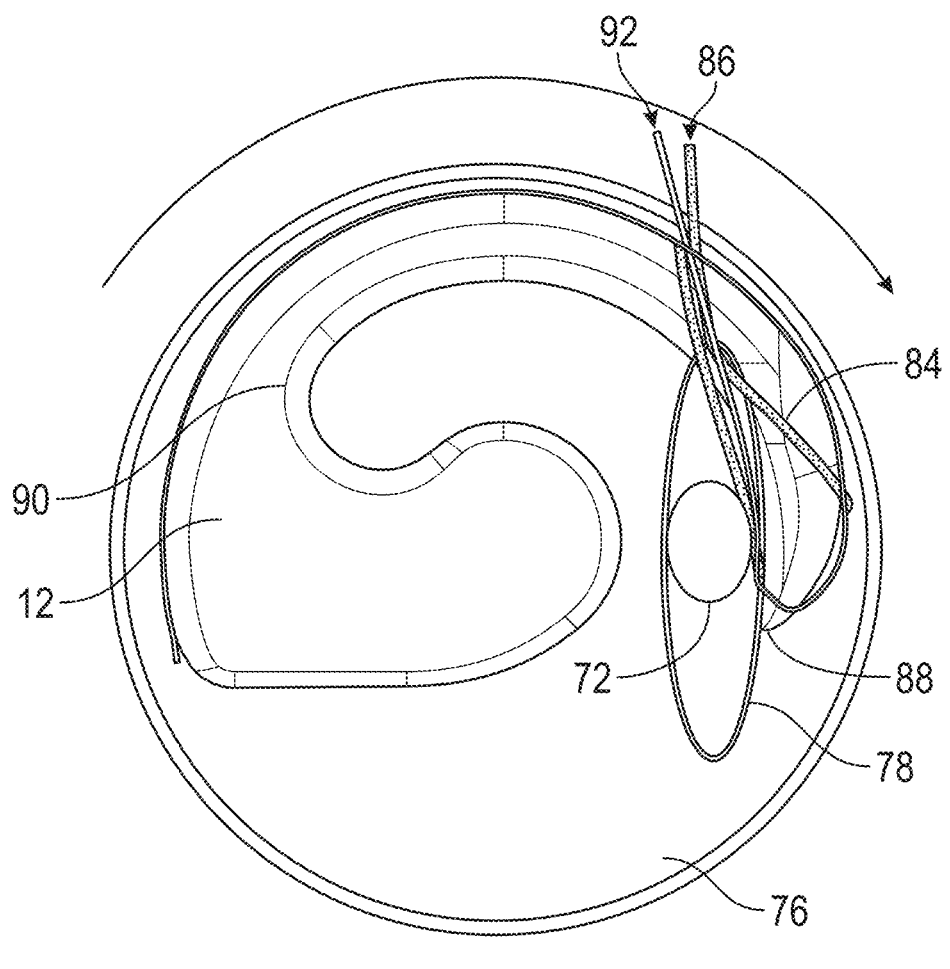
FIG. 19 is a top view of the looper 12 as it picks up the top thread loop.

FIG. 19 is a top view of the looper 12 as it picks up the top thread loop.

It is understood that the location and timing of the thread brake 106 engagement/disengagement to the needle bar 107 can be adjusted as required to achieve optimal top thread loop formation prior to and during pickup by the looper 12.

In one embodiment, part 74 may be a portion of an interior portion of a vehicle. In one implementation this portion may be any portion of an interior of the vehicle. For example, portion may comprise a portion of an instrument panel of a vehicle. Of course, portion may be located on any surface within the vehicle. Non-limiting examples include; vehicle door panels, vehicle console lids, vehicle console panels, instrument panels, vehicle arm rests, headliners, seat backs, package trays, any decorative vehicle interior surface. Still further, the methodology disclosed herein may be applied to items or components used in other non-vehicular manufac- turing processes and thus portion or part 74 may refer to any article of manufacture.

The interior portion or item or part 74 may be a single layer or multi-layered construction. In one embodiment, the part 74 includes at least an outer skin layer having a substantially smooth outer surface and an underside facing away from the outer surface. The outer skin layer is pref- erably formed of a plastic material of substantial flexibility and aesthetically pleasing character. Of course, other mate- rials natural (e.g., leather, etc.) and simulated coverings are contemplated to be used in various embodiments of the present invention. In one embodiment, the interior portion is a decorative element of a vehicle interior.

In order to enhance the softness of interior portion and in one embodiment, a layer of cushioning support material may be provided in the region below the outer skin layer. It is contemplated that the cushioning support material may be of any number of different constructions although a foamed material such as cross linked polypropylene (XLPP) or polyurethane (PU) foam may be potentially preferred.

A substrate panel of dimensionally stable plastic or other suitable material may also be disposed below the cushioning support material.

According to one embodiment, the cushioning support material and the substrate panel may serve cooperatively to provide a support structure for the outer skin layer.

It is contemplated that PU foam forming the cushioning support material may be blown between the outer skin layer and the substrate panel so as to form a multi-layered composite structure. It is also contemplated that the cush- ioning material may be attached to the outer skin layer in a preliminary cladding operation so as to form a preliminary layered composite which may thereafter be applied across any substrate panel as may be utilized. It is also contem- plated that the cushioning material may be attached to the outer substrate layer in a preliminary cladding operation so as to form a preliminary layered composite which may thereafter be wrapped with an outer skin layer.

Still further, the part may be anyone of a single layer (skin only), a double layer (skin/foam) or a triple layer (skin/ foam/substrate). In yet another alternative embodiment, the intermediary foam layer between the skin and substrate may be a spacer fabric instead of a foam layer. In yet another alternative embodiment, the spacer fabric may be used in conjunction with the foam layer either between skin and foam layer or between substrate and foam layer or between both the skin and foam layer and foam layer and substrate.

Accordingly, the methods and related apparatus disclosed herein are contemplated as being used with anyone of the aforementioned part 74 configurations.

In another embodiment, the part 74 may be formed by a vacuum forming process or a vacuum formed part that may have a single layer or multiple layers some of which may be formed from different materials and wherein the part has a three dimensional configuration with various configurations. In addition, the aforementioned part may have rigidity associated with it in that the part cannot be adequately flexed during a stitching process or application.

As discussed above, there is a desire to provide a live, non-functional stitch on decorative automotive trim compo- nents without using costly cut-n-sew technologies. In accor- dance with one embodiment of the present invention, the method is used to apply a double stitch wherein stitched are located adjacent (e.g., opposite and parallel to each other).

Various embodiments of the present invention are directed to an alternative method of applying decorative stitching to unformed and preformed material constructions used in the transportation industry or vehicle and vehicle part manufac- ture. The methods disclosed herein can be used for both flatstock material (cut-n-sew) but provides greater benefit when used on a part that has some degree of rigidity such that it cannot be easily flattened without causing damage to the material.

As used herein, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. In addition, it is noted that the terms "bottom" and "top" are used herein, unless otherwise noted, merely for convenience of description, and are not limited to any one position or spatial orientation.

The modifier "about" used in connection with a quantity is inclusive of the stated value and has the meaning dictated by the context (e.g., includes the degree of error associated with measurement of the particular quantity).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodi- ment disclosed as the best mode contemplated for carrying out this invention, but that the invention will include all embodiments falling within the scope of the present appli- cation.

What is claimed is:

1. A method for applying stitches to a decorative compo- nent having a three dimensional configuration, comprising:
   operatively coupling a needle bar assembly to a head configured for applying the stitches to the decorative component;
   cooperating a looper with the needle bar assembly in order to provide a plurality of stitches in the decorative component, the looper rotating in a plane parallel to the decorative component;
   driving the looper in a reciprocating fashion in the plane with a post assembly, wherein the post assembly is operatively coupled to a motor configured to drive the needle bar assembly in a reciprocating fashion, the post assembly being operatively coupled to the head via a cylinder arm assembly and a downshaft assembly; and rotating the cylinder arm assembly in a synchronized manner with a rock frame through mechanical linkage connecting a rock frame drive shaft to the cylinder arm assembly.

2. The method as in claim 1, further comprising reciprocally driving the needle bar assembly with an upper driveshaft operatively coupled to the motor and reciprocally driving the post assembly by the upper driveshaft via an intermediary driveshaft.

3. The method as in claim 2, further comprising removably securing at least one of the cylinder arm assembly and/or the downshaft assembly are removably secured to the head such that another cylinder arm assembly and/or another down shaft assembly is capable of being secured to the head such that the post assembly is relocated with respect to the needle bar assembly of the head.

4. The method as in claim 1, further comprising removably securing at least one of the cylinder arm assembly and/or the downshaft assembly to the head such that another cylinder arm assembly and/or another down shaft assembly is capable of being secured to the head such that the post assembly is relocated with respect to the needle bar assembly of the head.

5. The method as in claim 1, wherein the cylinder arm assembly and the downshaft assembly are interchangeable with another cylinder arm assembly and another downshaft assembly such that the post assembly can be relocated with respect to the needle bar assembly.

6. The method as in claim 1, further comprising another needle and another looper configured to cooperate with the another needle in order to simultaneously provide two discrete patterns of a plurality of stitches in the decorative component, the another looper rotating in the plane parallel to the decorative component.

7. The method as in claim 6, wherein the post assembly is configured to drive the looper and the another looper in a reciprocating fashion in the plane, wherein the post assembly is operatively coupled to a motor configured to drive the needle bar assembly containing two needles in a reciprocating fashion.

8. The method as in claim 7, further comprising controlling a size and a position of a top thread loop prior to and during engagement of the top thread loop with the looper with an upper thread brake configured to control the size and stabilize the position of the top thread loop.

9. The method as in claim 2, further comprising controlling a size and a position of a top thread loop prior to and during engagement of the top thread loop with the looper with an upper thread brake configured to control the size and stabilize the position of the top thread loop.

10. The method as in claim 1, further comprising controlling a size and a position of a top thread loop prior to and during engagement of the top thread loop with the looper with an upper thread brake configured to control the size and stabilize the position of the top thread loop.

11. An apparatus for applying stitches to a decorative component having a three dimensional configuration, comprising:

a head, comprising:

a needle bar assembly operatively coupled to the head;

a looper configured to cooperate with the needle bar assembly in order to provide a plurality of stitches in the decorative component, the looper rotating in a plane parallel to the decorative component;

a post assembly configured to drive the looper in a reciprocating fashion in the plane, wherein the post assembly is operatively coupled to a motor configured to drive the needle bar assembly in a reciprocating fashion, the post assembly being operatively coupled to the head via a cylinder arm assembly and a downshaft assembly; and wherein the cylinder arm assembly is rotated in a synchronized manner with a rock frame through mechanical linkage connecting a rock frame drive shaft to the cylinder arm assembly; and an external drive for moving the head over and around the decorative component.

12. The apparatus as in claim 11, wherein the external drive is a 6-axis robot.

13. The apparatus as in claim 11, wherein the needle bar assembly is reciprocally driven by an upper driveshaft operatively coupled to the motor and the post assembly is also reciprocally driven by the upper driveshaft via an intermediary driveshaft.

14. The apparatus as in claim 13, wherein at least one of the cylinder arm assembly and/or the downshaft assembly are removably secured to the head such that another cylinder arm assembly and/or another down shaft assembly is capable of being secured to the head such that the post assembly is relocated with respect to the needle bar assembly of the head.

15. The apparatus as in claim 11, wherein at least one of the cylinder arm assembly and/or the downshaft assembly are removably secured to the head such that another cylinder arm assembly and/or another down shaft assembly is capable of being secured to the head such that the post assembly is relocated with respect to the needle bar assembly of the head.

16. The apparatus as in claim 11, wherein the cylinder arm assembly and the downshaft assembly are interchangeable with another cylinder arm assembly and another downshaft assembly such that the post assembly can be relocated with respect to the needle bar assembly.

17. The apparatus as in claim 11, further comprising another needle and another looper configured to cooperate with the another needle in order to simultaneously provide two discrete patterns of a plurality of stitches in the decorative component, the another looper rotating in the plane parallel to the decorative component.

18. The apparatus as in claim 17, wherein the post assembly is configured to drive the looper and the another looper in a reciprocating fashion in the plane, wherein the post assembly is operatively coupled to a motor configured to drive the needle bar assembly containing two needles in a reciprocating fashion.

19. The apparatus as in claim 18, further comprising an upper thread brake configured to control a size and stabilize a position of a top thread loop prior to and during engagement of the top thread loop with the looper.

20. The apparatus as in claim 11, further comprising an upper thread brake configured to control a size and stabilize a position of a top thread loop prior to and during engagement of the top thread loop with the looper.

* * * * *